US012250694B2

United States Patent
Islam et al.

(10) Patent No.: US 12,250,694 B2
(45) Date of Patent: Mar. 11, 2025

(54) DOWNLINK CONTROL CHANNEL SIGNALING FOR UL COEXISTENCE OF MULTIPLE SERVICE TYPES

(71) Applicant: Apple Inc., Cupertino, CA (US)

(72) Inventors: Toufiqul Islam, Cupertino, CA (US); Debdeep Chatterjee, Cupertino, CA (US); Sergey Panteleev, Cupertino, CA (US); Fatemeh Hamidi-Sepehr, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 17/438,672

(22) PCT Filed: May 1, 2020

(86) PCT No.: PCT/US2020/031049
§ 371 (c)(1),
(2) Date: Sep. 13, 2021

(87) PCT Pub. No.: WO2020/227103
PCT Pub. Date: Nov. 12, 2020

(65) Prior Publication Data
US 2022/0159701 A1    May 19, 2022

Related U.S. Application Data

(60) Provisional application No. 62/842,882, filed on May 3, 2019.

(51) Int. Cl.
*H04W 72/00* (2023.01)
*H04L 1/1812* (2023.01)
(Continued)

(52) U.S. Cl.
CPC ........... *H04W 72/23* (2023.01); *H04L 1/1812* (2013.01); *H04L 5/0053* (2013.01)

(58) Field of Classification Search
CPC ..... H04W 72/23; H04L 1/1812; H04L 5/0053
See application file for complete search history.

(56) References Cited

U.S. PATENT DOCUMENTS 11,310,827 B2 *  4/2022  Bae ........................ H04W 72/23
2018/0070341 A1   3/2018  Islam et al.
(Continued)

FOREIGN PATENT DOCUMENTS

| CN | 101884179 | 11/2010 |
| CN | 102598810 | 7/2012 |

(Continued)

OTHER PUBLICATIONS

[No Author Listed], "3rd Generation Partnership Project; Technical Specification Group Radio Access Network; NR; Physical layer procedures for data (Release 15)," 3GPP TS 38.214 V15.5.0, Mar. 2019, 103 pages.

(Continued)

*Primary Examiner* — Khai M Nguyen
(74) *Attorney, Agent, or Firm* — Fish & Richardson P.C.

(57) ABSTRACT

Systems, devices, and techniques for controlling uplink transmissions including cancelling previously scheduled transmissions are described. A described technique includes receiving, by a user equipment (UE), a configuration information that provides a search space set configuration associated with a control resource set (CORESET) to monitor for an uplink cancellation indication; receiving, by the UE, scheduling information that schedules one or more uplink transmissions; monitoring, by the UE via a physical downlink control channel (PDCCH), for the uplink cancellation indication based on the configuration information; receiving, by the UE via the PDCCH, a downlink control information (DCI) message that comprises the uplink cancellation indication; and cancelling, by the UE, at least part of the one or (Continued)

more uplink transmissions in response to the uplink cancellation indication.

24 Claims, 12 Drawing Sheets

(51) Int. Cl.
*H04L 5/00* (2006.01)
*H04W 72/23* (2023.01)

(56) References Cited

U.S. PATENT DOCUMENTS

| | | | |
|---|---|---|---|
| 2018/0167916 | A1 | 6/2018 | Zhang et al. |
| 2018/0270800 | A1 | 9/2018 | Park et al. |
| 2020/0344747 | A1 | 10/2020 | Park |
| 2020/0351897 | A1* | 11/2020 | Fakoorian ............. H04L 5/0096 |
| 2020/0359447 | A1* | 11/2020 | Yang ................. H04W 74/0833 |
| 2021/0014866 | A1 | 1/2021 | Shi et al. |
| 2021/0345366 | A1* | 11/2021 | Ying ................. H04W 72/0453 |
| 2022/0132342 | A1* | 4/2022 | Kim ................. H04W 74/0816 |
| 2022/0159683 | A1* | 5/2022 | Islam ................. H04W 72/1268 |
| 2022/0174658 | A1* | 6/2022 | Shapin ................. H04W 72/51 |
| 2022/0386243 | A1* | 12/2022 | Liang ................. H04W 52/226 |

FOREIGN PATENT DOCUMENTS

| | | | |
|---|---|---|---|
| CN | 107926037 | | 4/2018 |
| CN | 108633072 | | 10/2018 |
| EP | 3621377 | | 3/2020 |
| EP | 4181605 | A1 * | 5/2023 ............. H04L 5/001 |
| WO | WO 2018/203389 | | 11/2018 |

OTHER PUBLICATIONS

Fujitsu, "Discussion on UL cancellation indication," 3GPP TSG RAN WG1 #97, R1-1906585, Reno, USA, May 13-17, 2019, 4 pages.

International Preliminary Report in International Appln. No. PCT/US2020/031049, dated Nov. 18, 2021, 9 pages.

International Search Report and Written Opinion in International Appln. No. PCT/US2020/031049, dated Jul. 31, 2020, 15 pages.

Samsung, "Multiplexing of UL Transmissions with Different Reliability Requirements," 3GPP TSG RAN WG1 Meeting #92bis, R1-1804392, Sanya, China, Apr. 16-20, 2018 4 pages.

Vivo, "UL inter-UE Tx prioritization for URLLC," 3GPP TSG RAN WG1 #97, R1-1906150, Reno, USA, May 13-17, 2019, 13 pages.

Ericsson, "On Pre-emption in Uplink," 3GPP TSG-RAN WG1 Meeting #92b, R1-1803922, Sanya, P.R. China, Apr. 16-20, 2018, 5 pages.

Potevio, "Discussion on UL pre-emption for URLLC reliability," 3GPP TSG RAN WG1 Meeting #93, R1-1807228, May 21-25, 2018, Busan, Korea, 3 pages.

Qualcomm, "UL inter UE Tx prioritization/multiplexing," 3GPP TSG-RAN WG1 #94, R1-1809458, Aug. 20-24, 2018, Gothenburg, Sweden, 12 pages.

Samsung, "Uplink inter UE multiplexing/prioritization for enhanced URLLC," 3 GPP TSG RAN WG1 Meeting #94bis, R1-1810880, Oct. 8-12, 2018, Chegdu, China.

Spreadtrum Communications, "Discussion on UL inter UE Tx prioritization/multiplexing," 3GPP TSG RAN WG1 Meeting #95, R1-1813063, Nov. 12-16, 2018, Spokane, USA, 4 pages.

Vivo, "Summary #3 of UL inter UE Tx prioritization/multiplexing," 3GPP TSG RAN WG1 Meeting 1901, R1-1901457, Jan. 21-25, 2019, Taipei, Taiwan.

Vivo, "Summary of UL inter UE Tx prioritization/multiplexing;" 3GPP TSG RAN WG1 Meeting #96, R1-1903401, Feb. 25-Mar. 1, 2019, Athens, Greece, 48 pages.

* cited by examiner

DOWNLINK CONTROL CHANNEL SIGNALING FOR UL COEXISTENCE OF MULTIPLE SERVICE TYPES

CROSS-REFERENCE TO RELATED APPLICATION

This disclosure claims the benefit of the priority of U.S. Provisional Patent Application No. 62/842,882, entitled "DOWNLINK CONTROL CHANNEL SIGNALING FOR UL COEXISTENCE OF MULTIPLE SERVICE TYPES" and filed on May 3, 2019. The above-identified application is incorporated herein by reference in its entirety.

TECHNICAL FIELD

This disclosure relates generally to wireless communication systems.

BACKGROUND

Base stations, such as a node of radio access network (RAN), can wirelessly communicate with wireless devices such as user equipment (UE). A downlink (DL) transmission refers to a communication from the base station to the wireless device. An uplink (UL) transmission refers to a communication from the wireless device to another device such as the base station. Base stations can transmit control signaling in order to control wireless devices that operate within their network.

SUMMARY

Systems, devices, and techniques for controlling uplink transmissions including cancelling previously scheduled transmissions are described. A described technique includes receiving, by a UE, configuration information that provides a search space set configuration associated with a control resource set (CORESET) to monitor for an uplink cancellation indication; receiving, by the UE, scheduling information that schedules one or more uplink transmissions; monitoring, by the UE via a physical downlink control channel (PDCCH), for the uplink cancellation indication based on the configuration information; receiving, by the UE via the PDCCH, a downlink control information (DCI) message that includes the uplink cancellation indication; and cancelling, by the UE, at least part of the one or more uplink transmissions in response to the uplink cancellation indication. Other implementations include corresponding systems, apparatus, and computer programs to perform the actions of methods defined by instructions encoded on computer readable storage.

These and other implementations can include one or more of the following features. Receiving the configuration information can include receiving the configuration information in RRC signaling. The configuration information can include a monitoring duration to control a monitoring window during which the UE monitors the PDCCH for a cancellation indication, a monitoring offset to a start position of the monitoring window, a PDCCH monitoring periodicity, a monitoring pattern within a slot, or a combination thereof. In some implementations, the configuration information includes a cancellation indication based RNTI for using in detecting a DCI message that is scrambled by the RNTI.

In some implementations, a DCI message containing a cancellation indication is a UE-specific DCI message. In some implementations, a DCI message containing a cancellation indication is a group common DCI message. Receiving the scheduling information can include receiving a UE-specific message via the PDCCH. Monitoring for the uplink cancellation indication can include activating the search space set configuration in response to a reception of the UE-specific PDCCH message.

Receiving the scheduling information can include receiving an uplink grant that schedules a physical uplink shared channel (PUSCH) transmission. The uplink grant can be given in a DCI message. In some implementations, the scheduled PUSCH transmission is associated with a hybrid automatic repeat request (HARQ) process identifier (PID). Cancelling at least part of the one or more uplink transmissions can include cancelling the PUSCH transmission, one or more repetitions of the PUSCH transmission, or both.

A UE can include one or more processors; a transceiver; and a memory storing instructions that, when executed by the one or more processors, cause the one or more processors to perform operations. The operations can include receiving, via the transceiver, a configuration information that provides a search space set configuration associated with a CORESET to monitor for an uplink cancellation indication; receiving, via the transceiver, scheduling information that schedules one or more uplink transmissions; monitoring, via a PDCCH, for the uplink cancellation indication based on the configuration information; receiving, via the transceiver, a DCI message on the PDCCH, the DCI message including the uplink cancellation indication; and cancelling at least part of the one or more uplink transmissions in response to the uplink cancellation indication in the received DCI message.

One or more processors, for use in a device such as a UE, can be configured to receive, via a transceiver, a configuration information that provides a search space set configuration associated with a CORESET to monitor for an uplink cancellation indication; receive, via the transceiver, scheduling information that schedules one or more uplink transmissions; monitoring, via the transceiver, for the uplink cancellation indication on a PDCCH based on the configuration information; receive, via the transceiver, a DCI message on the PDCCH, the DCI message including the uplink cancellation indication; and cancel at least part of the one or more uplink transmissions in response to the uplink cancellation indication in the received DCI message.

The details of one or more implementations are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
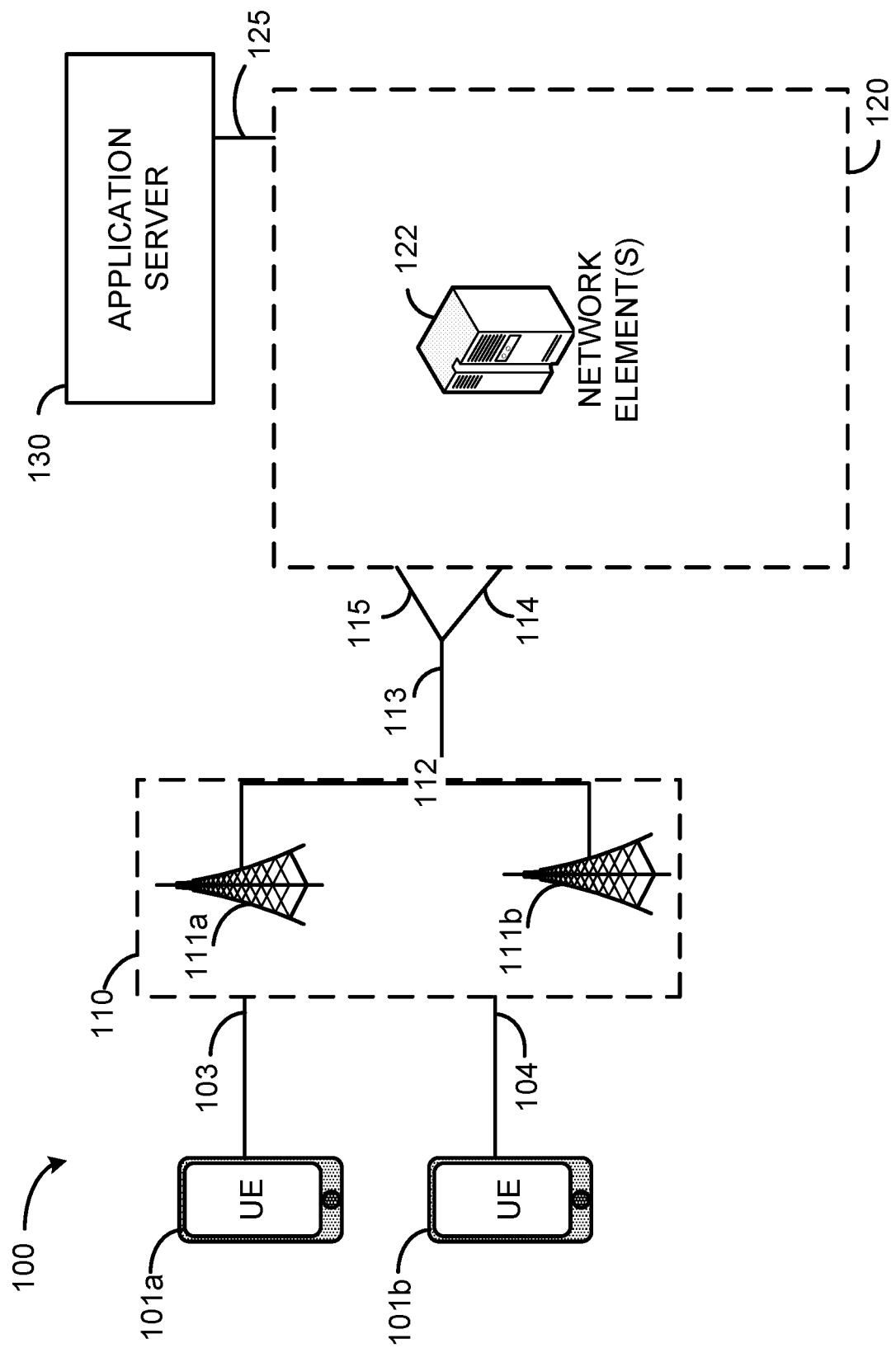
FIG. 1 illustrates an example of a wireless communication system.

FIG. 1 illustrates an example of a wireless communication system 100. For purposes of convenience and without limitation, the example system 100 is described in the context of the LTE and 5G NR communication standards as defined by the Third Generation Partnership Project (3GPP) technical specifications. However, other types of communication standards are possible.

The system 100 includes UE 101a and UE 101b (collectively referred to as the "UEs 101"). Examples of UEs 101 include smartphones (e.g., handheld touchscreen mobile computing devices connectable to one or more cellular networks). In other examples, any of the UEs 101 can include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an instrument cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some implementations, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which can include uniquely identifiable embedded computing devices (within the Internet infrastructure), with short-lived connections. The IoT UEs may execute background applications (e.g., keep-alive messages or status updates) to facilitate the connections of the IoT network.

The UEs 101 are configured to connect (e.g., communicatively couple) with an access network (AN) or radio access network (RAN) 110. In some implementations, the RAN 110 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" may refer to a RAN 110 that operates in a 5G NR system 100, and the term "E-UTRAN" may refer to a RAN 110 that operates in an LTE or 4G system 100.

To connect to the RAN 110, the UEs 101 utilize connections (or channels) 103 and 104, respectively, each of which can include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a LTE-M, protocol, a 5G NR protocol, or combinations of them, among other communication protocols.

The RAN 110 can include RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, road side units (RSUs), and the like, and can include ground stations (e.g., terrestrial access points) or satellite stations providing coverage within a geographic area (e.g., a cell), among others. As used herein, the term "NG RAN node" may refer to a RAN node 111 that operates in an 5G NR system 100 (for example, a gNB), and the term "E-UTRAN node" may refer to a RAN node 111 that operates in an LTE or 4G system 100 (e.g., an eNB). In some implementations, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

Any of the RAN nodes 111 can terminate the air interface protocol and can be the first point of contact for the UEs 101. In some implementations, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some implementations, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink communications), although the scope of the techniques described here not limited in this respect. The OFDM signals can comprise a plurality of orthogonal subcarriers.

In some implementations, a downlink resource grid can be used for downlink transmissions from any of the RAN nodes 111 to the UEs 101, while uplink transmissions can utilize similar techniques. The grid can be a frequency grid or a time-frequency grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical channels that can be conveyed using such resource blocks.

The RAN nodes 111 can transmit to the UEs 101 over one or more DL channels. Various examples of DL communication channels include a physical broadcast channel (PBCH), physical downlink control channel (PDCCH), and physical downlink shared channel (PDSCH). Other types of DL channels are possible. The PDSCH, for example, can carry user data and higher-layer signaling to the UEs 101. The UEs 101 can transmit to the RAN nodes 111 over one or more UL channels. Various examples of UL communication channels include physical uplink shared channel (PUSCH), physical uplink control channel (PUCCH), and physical random access channel (PRACH). Other types of UL channels are possible. Devices such as the RAN nodes 111 and the UEs 101 can transmit reference signals. Examples of reference signals include a sounding reference signal (SRS), channel state information reference signal (CSI-RS), demodulation reference signal (DMRS or DM-RS), and phase tracking reference signal (PTRS). Other types of reference signals are possible.

A channel such as PDCCH can convey scheduling information of different types for one or more downlink and uplink channels. Scheduling information can include downlink resource scheduling, uplink power control instructions, uplink resource grants, and indications for paging or system information. The RAN nodes 111 can transmit one or more downlink control information (DCI) messages on the PDCCH to provide scheduling information, such as allocations of one or more resource blocks. In some implementations, a DCI message transports control information such as requests for aperiodic CQI reports, UL power control commands for a channel, and a notification for a group of UEs 101 of a slot format. Downlink scheduling (e.g., assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101 or a group of UEs. In some implementations, the PDCCH carries information about the transport format and resource allocations related to the PDSCH channel, among other things. It may also inform the UEs 101 about the transport format, resource allocation, and hybrid automatic repeat request (HARQ) information for providing HARQ feedback on an uplink channel based on a PDSCH reception.

In some implementations, the PDCCH uses control channel elements (CCEs) to convey the control information. Before being mapped to resource elements, the PDCCH complex-valued symbols may first be organized into quadruplets, which may then be permuted using a sub-block interleaver for rate matching. In some implementations, each PDCCH may be transmitted using one or more of these CCEs, in which each CCE may correspond to nine sets of four physical resource elements collectively referred to as resource element groups (REGs). Four Quadrature Phase Shift Keying (QPSK) symbols may be mapped to each REG.

The PDCCH can be transmitted using one or more CCEs, depending on the size of DCI and the channel condition. In some implementations, there can be four or more different PDCCH formats defined with different numbers of CCEs (e.g., aggregation level, L=1, 2, 4, or 8).

Downlink and uplink transmissions can occur in one or more component carriers (CCs). One or more bandwidth part (BWP) configurations for each component carrier can be configured. In some implementations, a DL BWP includes at least one control resource set (CORESET). A CORESET can include a group of one or more contiguous physical resource block (PRBs). In some implementations, a CORESET can include a group of one or more contiguous or non-contiguous PRBs. In some implementations, a CORESET includes one or more PRBs in a frequency domain, and one or more OFDM symbols in a time domain. In some implementations, channels such as PDCCH can be transmitted via one or more CORESETs, with each CORESET corresponding to a set of time-frequency resources. CORESET information can be provided to a UE 101, and the UE 101 can monitor time-frequency resources associated with one or more CORESETs to receive a PDCCH transmission. In some implementations, CORESETs are semi-statically configured by the network.

In some implementations, data can be transmitted using one or more code blocks within a transport block (TB). One or more code blocks can be grouped together in a code block group (CBG). A TB can include one or more CBGs. CBG transmission information (CBGTI) can be provided in a DCI message.

Figure 2:
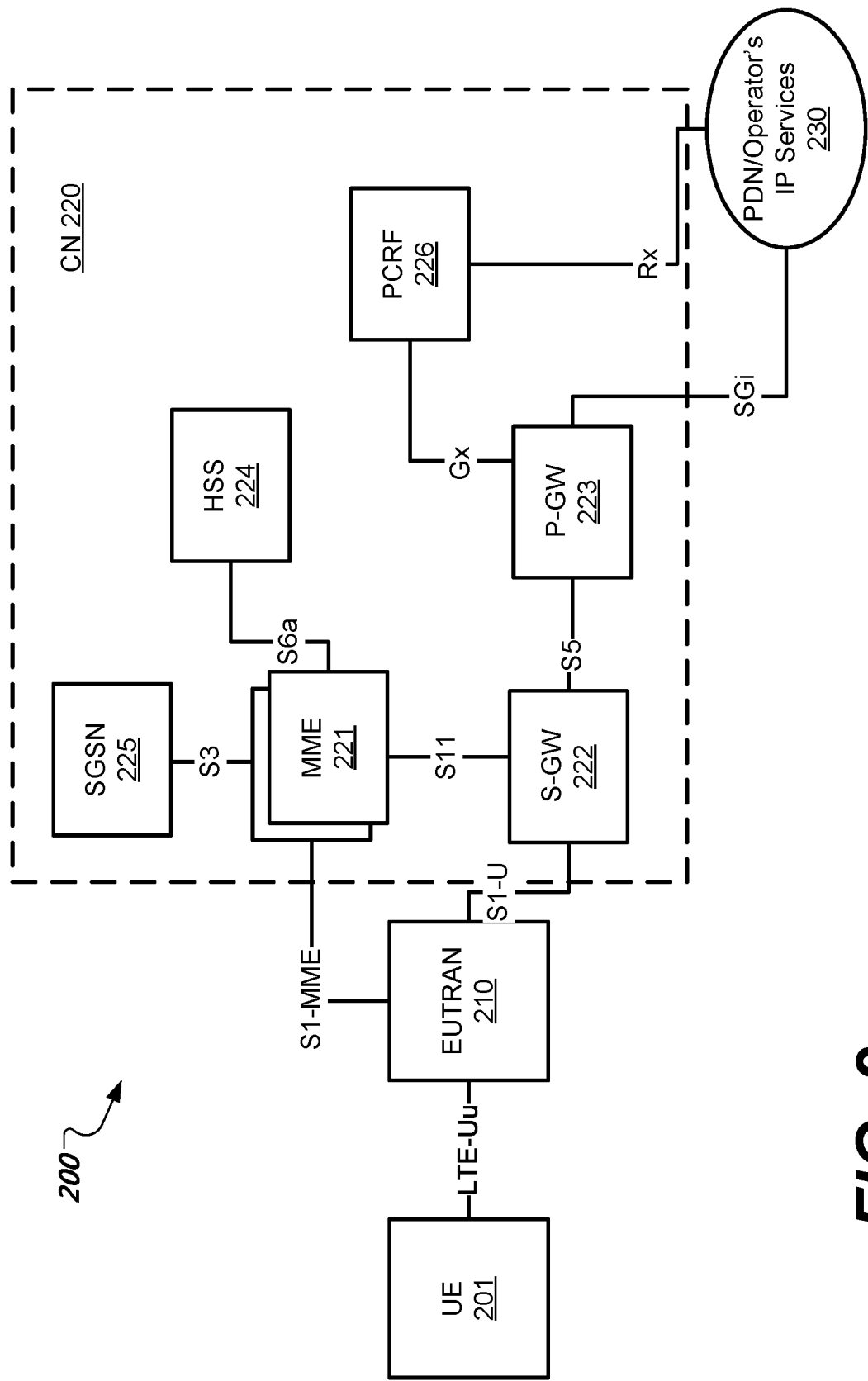
FIG. 2 illustrates an example architecture of a system including a core network.

The RAN nodes 111 are configured to communicate with one another using an interface 112. In examples, such as where the system 100 is an LTE system (e.g., when the core network 120 is an evolved packet core (EPC) network as shown in FIG. 2), the interface 112 may be an X2 interface 112. The X2 interface may be defined between two or more RAN nodes 111 (e.g., two or more eNBs and the like) that connect to the EPC 120, or between two eNBs connecting to EPC 120, or both. In some implementations, the X2 interface can include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB to a secondary eNB; information about successful in sequence delivery of PDCP protocol data units (PDUs) to a UE 101 from a secondary eNB for user data; information of PDCP PDUs that were not delivered to a UE 101; information about a current minimum desired buffer size at the secondary eNB for transmitting to the UE user data, among other information. The X2-C may provide intra-LTE access mobility functionality, including context transfers from source to target eNBs or user plane transport control; load management functionality; inter-cell interference coordination functionality, among other functionality.

Figure 3:
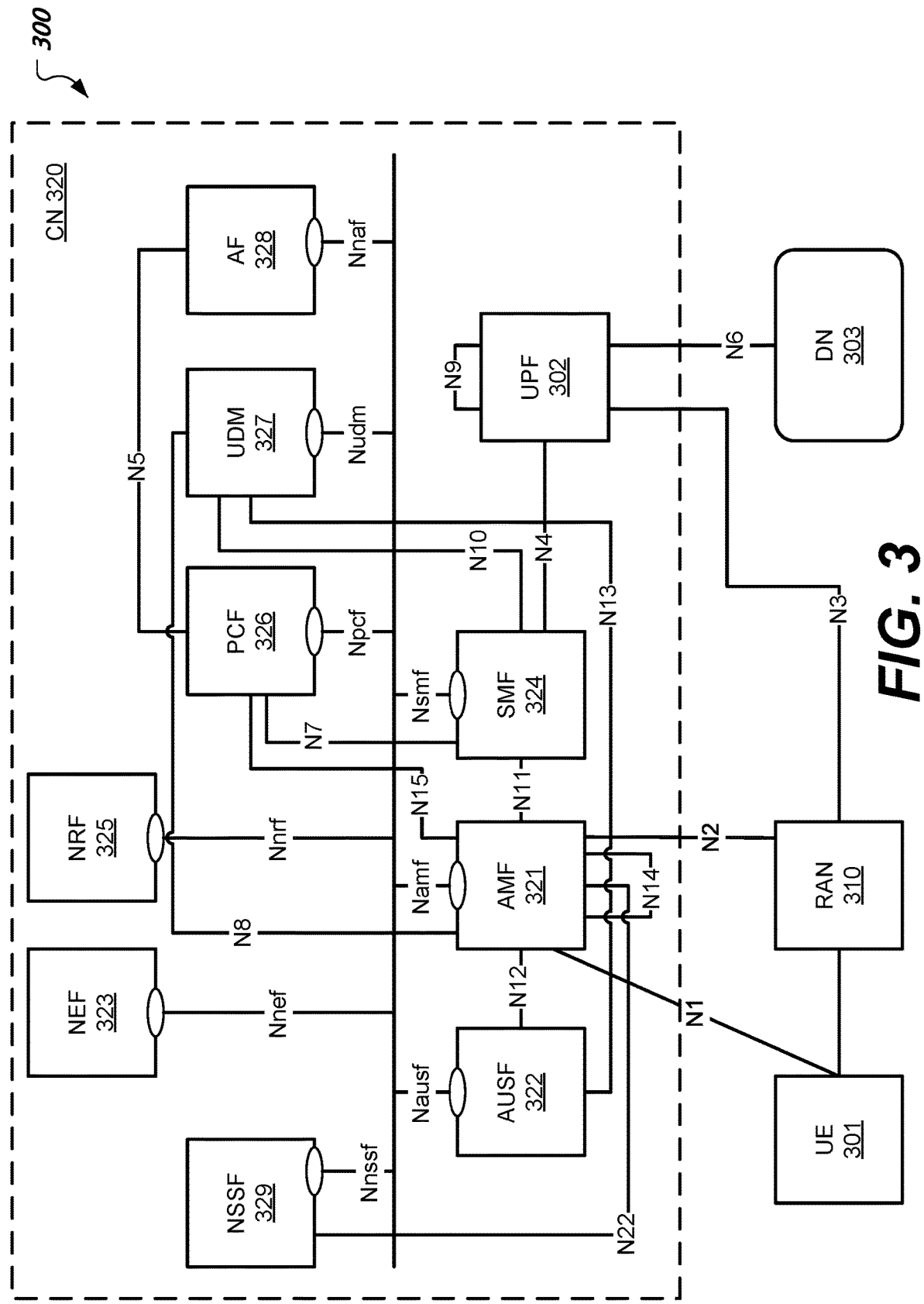
FIG. 3 illustrates another example architecture of a system including a core network.

In some implementations, such as where the system 100 is a 5G NR system (e.g., when the core network 120 is a 5G core network as shown in FIG. 3), the interface 112 may be an Xn interface 112. The Xn interface may be defined between two or more RAN nodes 111 (e.g., two or more gNBs and the like) that connect to the 5G core network 120, between a RAN node 111 (e.g., a gNB) connecting to the 5G core network 120 and an eNB, or between two eNBs connecting to the 5G core network 120, or combinations of them. In some implementations, the Xn interface can include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111, among other functionality. The mobility support can include context transfer from an old (source) serving RAN node 111 to new (target) serving RAN node 111, and control of user plane tunnels between old (source) serving RAN node 111 to new (target) serving RAN node 111. A protocol stack of the Xn-U can include a transport network layer built on Internet Protocol (IP) transport layer, and a GPRS tunneling protocol for user plane (GTP-U) layer on top of a user datagram protocol (UDP) or IP layer(s), or both, to carry user plane PDUs. The Xn-C protocol stack can include an application layer signaling protocol (referred to as Xn Application Protocol (Xn-AP or XnAP)) and a transport network layer that is built on a stream control transmission protocol (SCTP). The SCTP may be on top of an IP layer, and may provide the guaranteed delivery of application layer messages. In the transport IP layer, point-to-point transmission is used to deliver the signaling PDUs. In other implementations, the Xn-U protocol stack or the Xn-C protocol stack, or both, may be same or similar to the user plane and/or control plane protocol stack(s) shown and described herein.

The RAN 110 is shown to be communicatively coupled to a core network 120 (referred to as a "CN 120"). The CN 120 includes one or more network elements 122, which are configured to offer various data and telecommunications services to customers/subscribers (e.g., users of UEs 101) who are connected to the CN 120 using the RAN 110. The components of the CN 120 may be implemented in one physical node or separate physical nodes and can include components to read and execute instructions from a machine-readable or computer-readable medium (e.g., a non-transitory machine-readable storage medium). In some implementations, network functions virtualization (NFV) may be used to virtualize some or all of the network node functions described here using executable instructions stored in one or more computer-readable storage mediums, as described in further detail below. A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more network components or functions, or both.

An application server 130 may be an element offering applications that use IP bearer resources with the core network (e.g., UMTS packet services (PS) domain, LTE PS data services, among others). The application server 130 can also be configured to support one or more communication services (e.g., VoIP sessions, PTT sessions, group communication sessions, social networking services, among others) for the UEs 101 using the CN 120. The application server 130 can use an IP communications interface 125 to communicate with one or more network elements 112.

In some implementations, the CN 120 may be a 5G core network (referred to as "5GC 120" or "5G core network 120"), and the RAN 110 may be connected with the CN 120 using a next generation interface 113. In some implementations, the next generation interface 113 may be split into two parts, an next generation user plane (NG-U) interface 114, which carries traffic data between the RAN nodes 111 and a user plane function (UPF), and the S1 control plane (NG-C) interface 115, which is a signaling interface between the RAN nodes 111 and access and mobility management functions (AMFs). Examples where the CN 120 is a 5G core network are discussed in more detail with regard to FIG. 3.

In some implementations, the CN 120 may be an EPC (referred to as "EPC 120" or the like), and the RAN 110 may be connected with the CN 120 using an S1 interface 113. In some implementations, the S1 interface 113 may be split into two parts, an S1 user plane (S1-U) interface 114, which carries traffic data between the RAN nodes 111 and the serving gateway (S-GW), and the S1-MME interface 115, which is a signaling interface between the RAN nodes 111 and mobility management entities (MMEs).

In some implementations, some or all of the RAN nodes 111 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111; a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform, for example, other virtualized applications. In some implementations, an individual RAN node 111 may represent individual gNB distributed units (DUs) that are connected to a gNB central unit (CU) using individual F1 interfaces (not shown in FIG. 1). In some implementations, the gNB-DUs can include one or more remote radio heads or RFEMs (see, e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), including RAN nodes that provide E-UTRA user plane and control plane protocol terminations toward the UEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some implementations, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and can include a network interface controller to provide a wired connection (e.g., Ethernet) to a traffic signal controller or a backhaul network, or both.

FIG. 2 illustrates an example architecture of a system 200 including a first CN 220. In this example, the system 200 may implement the LTE standard such that the CN 220 is an EPC 220 that corresponds with CN 120 of FIG. 1. Additionally, the UE 201 may be the same or similar as the UEs 101 of FIG. 1, and the E-UTRAN 210 may be a RAN that is the same or similar to the RAN 110 of FIG. 1, and which can include RAN nodes 111 discussed previously. The CN 220 may comprise MMEs 221, an S-GW 222, a PDN gateway (P-GW) 223, a high-speed packet access (HSS) function 224, and a serving GPRS support node (SGSN) 225.

The MMEs 221 may be similar in function to the control plane of legacy SGSN, and may implement mobility management (MM) functions to keep track of the current location of a UE 201. The MMEs 221 may perform various mobility management procedures to manage mobility aspects in access such as gateway selection and tracking area list management. Mobility management (also referred to as "EPS MM" or "EMM" in E-UTRAN systems) may refer to all applicable procedures, methods, data storage, and other aspects that are used to maintain knowledge about a present location of the UE 201, provide user identity confidentiality, or perform other like services to users/subscribers, or combinations of them, among others. Each UE 201 and the MME 221 can include an EMM sublayer, and an mobility management context may be established in the UE 201 and the MME 221 when an attach procedure is successfully completed. The mobility management context may be a data structure or database object that stores mobility management-related information of the UE 201. The MMEs 221 may be coupled with the HSS 224 using a S6a reference point, coupled with the SGSN 225 using a S3 reference point, and coupled with the S-GW 222 using a S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network, among other functions. The S3 reference point between the MMEs 221 and the SGSN 225 may enable user and bearer information exchange for inter-3GPP access network mobility in idle or active states, or both.

The HSS 224 can include a database for network users, including subscription-related information to support the network entities' handling of communication sessions. The EPC 220 can include one or more HSSs 224 depending on the number of mobile subscribers, on the capacity of the equipment, on the organization of the network, or combinations of them, among other features. For example, the HSS 224 can provide support for routing, roaming, authentication, authorization, naming/addressing resolution, location dependencies, among others. A S6a reference point between the HSS 224 and the MMEs 221 may enable transfer of subscription and authentication data for authenticating or authorizing user access to the EPC 220 between HSS 224 and the MMEs 221.

The S-GW 222 may terminate the S1 interface 113 ("S1-U" in FIG. 2) toward the RAN 210, and may route data packets between the RAN 210 and the EPC 220. In addition, the S-GW 222 may be a local mobility anchor point for inter-RAN node handovers and also may provide an anchor for inter-3GPP mobility. Other responsibilities can include lawful intercept, charging, and some policy enforcement. The S11 reference point between the S-GW 222 and the MMEs 221 may provide a control plane between the MMEs 221 and the S-GW 222. The S-GW 222 may be coupled with the P-GW 223 using a S5 reference point.

The P-GW 223 may terminate a SGi interface toward a PDN 230. The P-GW 223 may route data packets between the EPC 220 and external networks such as a network including the application server 130 (sometimes referred to as an "AF") using an IP communications interface 125 (see, e.g., FIG. 1). In some implementations, the P-GW 223 may be communicatively coupled to an application server (e.g., the application server 130 of FIG. 1 or PDN 230 in FIG. 2) using an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a policy control and charging rules function (PCRF) 226 using a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 using the P-GW 223. The application server 230 may signal the PCRF 226 to indicate a new service flow and select the appropriate quality of service (QoS) and charging parameters. The PCRF 226 may provision this rule into a PCEF (not shown) with the appropriate traffic flow template (TFT) and QoS class identifier (QCI), which commences the QoS and charging as specified by the application server 230. The Gx reference point between the PCRF 226 and the P-GW 223 may allow for the transfer of QoS policy and charging rules from the PCRF 226 to PCEF in the P-GW 223. A Rx reference point may reside between the PDN 230 (or "AF 230") and the PCRF 226.

FIG. 3 illustrates an architecture of a system 300 including a second CN 320. The system 300 is shown to include a UE 301, which may be the same or similar to the UEs 101 and UE 201 discussed previously; a RAN 310, which may be the same or similar to the RAN 110 and RAN 210 discussed previously, and which can include RAN nodes 111 discussed previously; and a data network (DN) 303, which may be, for example, operator services, Internet access or 3rd party services; and a 5GC 320. The 5GC 320 can include an authentication server function (AUSF) 322; an access and mobility management function (AMF) 321; a session management function (SMF) 324; a network exposure function (NEF) 323; a policy control function (PCF) 326; a network repository function (NRF) 325; a unified data management (UDM) function 327; an AF 328; a user plane function (UPF) 302; and a network slice selection function (NSSF) 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 can include an uplink classifier to support routing traffic flows to a data network. The DN 303 may represent various network operator services, Internet access, or third party services. DN 303 can include, or be similar to, application server 130 discussed previously. The UPF 302 may interact with the SMF 324 using a N4 reference point between the SMF 324 and the UPF 302.

The AUSF 322 stores data for authentication of UE 301 and handle authentication-related functionality. The AUSF 322 may facilitate a common authentication framework for various access types. The AUSF 322 may communicate with the AMF 321 using a N12 reference point between the AMF 321 and the AUSF 322, and may communicate with the UDM 327 using a N13 reference point between the UDM 327 and the AUSF 322. Additionally, the AUSF 322 may exhibit a Nausf service-based interface.

The AMF 321 is responsible for registration management (e.g., for registering UE 301), connection management, reachability management, mobility management, and lawful interception of AMF-related events, and access authentication and authorization. The AMF 321 may be a termination point for the N11 reference point between the AMF 321 and the SMF 324. The AMF 321 may provide transport for SM messages between the UE 301 and the SMF 324, and act as a transparent pro10 for routing SM messages. AMF 321 may also provide transport for SMS messages between UE 301 and an SMSF (not shown in FIG. 3). AMF 321 may act as security anchor function (SEAF), which can include interaction with the AUSF 322 and the UE 301 to, for example, receive an intermediate key that was established as a result of the UE 301 authentication process. Where universal subscriber identity module (USIM) based authentication is used, the AMF 321 may retrieve the security material from the AUSF 322. AMF 321 may also include a security context management (SCM) function, which receives a key from the SEAF to derive access-network specific keys. Furthermore, AMF 321 may be a termination point of a RAN control plane interface, which can include or be a N2 reference point between the RAN 310 and the AMF 321. In some implementations, the AMF 321 may be a termination point of NAS (N1) signaling and perform NAS ciphering and integrity protection.

AMF 321 may also support NAS signaling with a UE 301 over a N3 interworking function (IWF) interface (referred to as the "N3IWF"). The N3IWF may be used to provide access to untrusted entities. The N3IWF may be a termination point for the N2 interface between the RAN 310 and the AMF 321 for the control plane, and may be a termination point for the N3 reference point between the RAN 310 and the UPF 302 for the user plane. As such, the AMF 321 may handle N2 signaling from the SMF 324 and the AMF 321 for PDU sessions and QoS, encapsulate/de-encapsulate packets for IPsec and N3 tunneling, mark N3 user-plane packets in the uplink, and enforce QoS corresponding to N3 packet marking taking into account QoS requirements associated with such marking received over N2. The N3IWF may also relay uplink and downlink control-plane NAS signaling between the UE 301 and AMF 321 using a N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit a Namf service-based interface, and may be a termination point for a N14 reference point between two AMFs 321 and a N17 reference point between the AMF 321 and a 5G equipment identity registry (EIR) (not shown in FIG. 3).

The UE 301 may register with the AMF 321 in order to receive network services. Registration management (RM) is used to register or deregister the UE 301 with the network (e.g., AMF 321), and establish a UE context in the network (e.g., AMF 321). The UE 301 may operate in a RM-REGISTERED state or an RM-DEREGISTERED state. In the RM DEREGISTERED state, the UE 301 is not registered with the network, and the UE context in AMF 321 holds no valid location or routing information for the UE 301 so the UE 301 is not reachable by the AMF 321. In the RM REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedures triggered by expiration of the periodic update timer (e.g., to notify the network that the UE 301 is still active), and perform a Registration Update procedure to update UE capability information or to re-negotiate protocol parameters with the network, among others.

The AMF 321 may store one or more RM contexts for the UE 301, where each RM context is associated with a specific access to the network. The RM context may be, for example, a data structure or database object, among others, that indicates or stores a registration state per access type and the periodic update timer. The AMF 321 may also store a 5GC mobility management (MM) context that may be the same or similar to the (E)MM context discussed previously. In some implementations, the AMF 321 may store a coverage enhancement mode B Restriction parameter of the UE 301 in an associated MM context or RM context. The AMF 321 may also derive the value, when needed, from the UE's usage setting parameter already stored in the UE context (and/or MM/RM context).

Connection management (CM) may be used to establish and release a signaling connection between the UE 301 and the AMF 321 over the N1 interface. The signaling connection is used to enable NAS signaling exchange between the UE 301 and the CN 320, and includes both the signaling connection between the UE and the AN (e.g., RRC connection or UE-N3IWF connection for non-3GPP access) and the N2 connection for the UE 301 between the AN (e.g., RAN 310) and the AMF 321. In some implementations, the UE 301 may operate in one of two CM modes: CM-IDLE mode or CM-CONNECTED mode. When the UE 301 is operating in the CM-IDLE mode, the UE 301 may have no NAS signaling connection established with the AMF 321 over the N1 interface, and there may be RAN 310 signaling connection (e.g., N2 or N3 connections, or both) for the UE 301. When the UE 301 is operating in the CM-CONNECTED mode, the UE 301 may have an established NAS signaling connection with the AMF 321 over the N1 interface, and there may be a RAN 310 signaling connection (e.g., N2 and/or N3 connections) for the UE 301. Establishment of a N2 connection between the RAN 310 and the AMF 321 may cause the UE 301 to transition from the CM-IDLE mode to the CM-CONNECTED mode, and the UE 301 may transition from the CM-CONNECTED mode to the CM-IDLE mode when N2 signaling between the RAN 310 and the AMF 321 is released.

The SMF 324 may be responsible for session management (SM), such as session establishment, modify and release, including tunnel maintain between UPF and AN node; UE IP address allocation and management (including optional authorization); selection and control of UP function; configuring traffic steering at the UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent using AMF over N2 to AN; and determining SSC mode of a session. SM may refer to management of a PDU session, and a PDU session (or "session") may refer to a PDU connectivity service that provides or enables the exchange of PDUs between a UE 301 and a data network (DN) 303 identified by a Data Network Name (DNN). PDU sessions may be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 may trigger a specific application in the UE 301. In response to receipt of the trigger message, the UE 301 may pass the trigger message (or relevant parts/information of the trigger message) to one or more identified applications in the UE 301. The identified application(s) in the UE 301 may establish a PDU session to a specific DNN. The SMF 324 may check whether the UE 301 requests are compliant with user subscription information associated with the UE 301. In this regard, the SMF 324 may retrieve and/or request to receive update notifications on SMF 324 level subscription data from the UDM 327.

The SMF 324 can include some or all of the following roaming functionality: handling local enforcement to apply QoS service level agreements (SLAs) (e.g., in VPLMN); charging data collection and charging interface (e.g., in VPLMN); lawful intercept (e.g., in VPLMN for SM events and interface to LI system); and support for interaction with external DN for transport of signaling for PDU session authorization/authentication by external DN. A N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, among others. In some implementations, the NEF 323 may authenticate, authorize, and/or throttle the AFs. The NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using standardized interfaces. The stored information can then be re-exposed by the NEF 323 to other NFs and AFs, or used for other purposes such as analytics, or both. Additionally, the NEF 323 may exhibit a Nnef service-based interface.

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behavior. The PCF 326 may also implement a front end to access subscription information relevant for policy decisions in a unified data repository (UDR) of the UDM 327. The PCF 326 may communicate with the AMF 321 using an N15 reference point between the PCF 326 and the AMF 321, which can include a PCF 326 in a visited network and the AMF 321 in case of roaming scenarios. The PCF 326 may communicate with the AF 328 using a N5 reference point between the PCF 326 and the AF 328; and with the SMF 324 using a N7 reference point between the PCF 326 and the SMF 324. The system 300 or CN 320, or both, may also include a N24 reference point between the PCF 326 (in the home network) and a PCF 326 in a visited network. Additionally, the PCF 326 may exhibit a Npcf service-based interface.

The UDM 327 may handle subscription-related information to support the network entities' handling of communication sessions, and may store subscription data of UE 301. For example, subscription data may be communicated between the UDM 327 and the AMF 321 using a N8 reference point between the UDM 327 and the AMF. The UDM 327 can include two parts, an application front end and a UDR (the front end and UDR are not shown in FIG. 3). The UDR may store subscription data and policy data for the UDM 327 and the PCF 326, or structured data for exposure and application data (including PFDs for application detection, application request information for multiple UEs 301) for the NEF 323, or both. The Nudr service-based interface may be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM can include a UDM front end, which is in charge of processing credentials, location management, subscription management and so on. Several different front ends may serve the same user in different transactions. The UDM front end accesses subscription information stored in the UDR and performs authentication credential processing, user identification handling, access authorization, registration/mobility management, and subscription management. The UDR may interact with the SMF 324 using a N10 reference point between the UDM 327 and the SMF 324. UDM 327 may also support SMS management, in which an SMS front end implements the similar application logic as discussed previously. Additionally, the UDM 327 may exhibit the Nudm service-based interface.

The AF 328 may provide application influence on traffic routing, provide access to the network capability exposure (NCE), and interact with the policy framework for policy control. The NCE may be a mechanism that allows the 5GC 320 and AF 328 to provide information to each other using NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 using the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit a Naf service-based interface.

The NSSF 329 may select a set of network slice instances serving the UE 301. The NSSF 329 may also determine allowed NSSAI and the mapping to the subscribed single network slice selection assistance information (S-NSSAI), if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 using an N22 reference point between AMF 321 and NSSF 329; and may communicate with another NSSF 329 in a visited network using a N31 reference point (not shown by FIG. 3). Additionally, the NSSF 329 may exhibit a Nnssf service-based interface.

As discussed previously, the CN 320 can include an SMSF, which may be responsible for SMS subscription checking and verification, and relaying SM messages to or from the UE 301 to or from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

The CN 120 may also include other elements that are not shown in FIG. 3, such as a data storage system, a 5G-EIR, a security edge protection pro10 (SEPP), and the like. The data storage system can include a structured data storage function (SDSF), an unstructured data storage function (UDSF), or both, among others. Any network function may store and retrieve unstructured data to or from the UDSF (e.g., UE contexts), using a N18 reference point between any NF and the UDSF (not shown in FIG. 3). Individual network functions may share a UDSF for storing their respective unstructured data or individual network functions may each have their own UDSF located at or near the individual network functions. Additionally, the UDSF may exhibit a Nudsf service-based interface (not shown in FIG. 3). The 5G-EIR may be a network function that checks the status of permanent equipment identifiers (PEI) for determining whether particular equipment or entities are blacklisted from the network; and the SEPP may be a non-transparent pro10 that performs topology hiding, message filtering, and policing on inter-PLMN control plane interfaces.

In some implementations, there may be additional or alternative reference points or service-based interfaces, or both, between the network function services in the network functions. However, these interfaces and reference points have been omitted from FIG. 3 for clarity. In one example, the CN 320 can include a Nx interface, which is an inter-CN interface between the MME (e.g., MME 221) and the AMF 321 in order to enable interworking between CN 320 and CN 220. Other example interfaces or reference points can include a N5g-EIR service-based interface exhibited by a 5G-EIR, a N27 reference point between the NRF in the visited network and the NRF in the home network, or a N31 reference point between the NSSF in the visited network and the NSSF in the home network, among others.

In some implementations, the components of the CN 220 may be implemented in one physical node or separate physical nodes and can include components to read and execute instructions from a machine-readable or computer-readable medium (e.g., a non-transitory machine-readable storage medium). In some implementations, the components of CN 320 may be implemented in a same or similar manner as discussed herein with regard to the components of CN 220. In some implementations, NFV is utilized to virtualize any or all of the above-described network node functions using executable instructions stored in one or more computer-readable storage mediums, as described in further detail below. A logical instantiation of the CN 220 may be referred to as a network slice, and individual logical instantiations of the CN 220 may provide specific network capabilities and network characteristics. A logical instantiation of a portion of the CN 220 may be referred to as a network sub-slice, which can include the P-GW 223 and the PCRF 226.

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 3), a network slice can include a RAN part and a CN part. The support of network slicing relies on the principle that traffic for different slices is handled by different PDU sessions. The network can realize the different network slices by scheduling or by providing different L1/L2 configurations, or both. The UE 301 provides assistance information for network slice selection in an appropriate RRC message if it has been provided by NAS. In some implementations, while the network can support large number of slices, the UE need not support more than 8 slices simultaneously.

A network slice can include the CN 320 control plane and user plane NFs, NG-RANs 310 in a serving PLMN, and a N3IWF functions in the serving PLMN. Individual network slices may have different S-NSSAI or different SSTs, or both. NSSAI includes one or more S-NSSAIs, and each network slice is uniquely identified by an S-NSSAI. Network slices may differ for supported features and network functions optimizations. In some implementations, multiple network slice instances may deliver the same services or features but for different groups of UEs 301 (e.g., enterprise users). For example, individual network slices may deliver different committed service(s) or may be dedicated to a particular customer or enterprise, or both. In this example, each network slice may have different S-NSSAIs with the same SST but with different slice differentiators. Additionally, a single UE may be served with one or more network slice instances simultaneously using a 5G AN, and the UE may be associated with eight different S-NSSAIs. Moreover, an AMF 321 instance serving an individual UE 301 may belong to each of the network slice instances serving that UE.

Network slicing in the NG-RAN 310 involves RAN slice awareness. RAN slice awareness includes differentiated handling of traffic for different network slices, which have been pre-configured. Slice awareness in the NG-RAN 310 is introduced at the PDU session level by indicating the S-NSSAI corresponding to a PDU session in all signaling that includes PDU session resource information. How the NG-RAN 310 supports the slice enabling in terms of NG-RAN functions (e.g., the set of network functions that comprise each slice) is implementation dependent. The NG-RAN 310 selects the RAN part of the network slice using assistance information provided by the UE 301 or the 5GC 320, which unambiguously identifies one or more of the pre-configured network slices in the PLMN. The NG-RAN 310 also supports resource management and policy enforcement between slices as per SLAs. A single NG-RAN node may support multiple slices, and the NG-RAN 310 may also apply an appropriate RRM policy for the SLA in place to each supported slice. The NG-RAN 310 may also support QoS differentiation within a slice.

The NG-RAN 310 may also use the UE assistance information for the selection of an AMF 321 during an initial attach, if available. The NG-RAN 310 uses the assistance information for routing the initial NAS to an AMF 321. If the NG-RAN 310 is unable to select an AMF 321 using the assistance information, or the UE 301 does not provide any such information, the NG-RAN 310 sends the NAS signaling to a default AMF 321, which may be among a pool of AMFs 321. For subsequent accesses, the UE 301 provides a temp ID, which is assigned to the UE 301 by the 5GC 320, to enable the NG-RAN 310 to route the NAS message to the appropriate AMF 321 as long as the temp ID is valid. The NG-RAN 310 is aware of, and can reach, the AMF 321 that is associated with the temp ID. Otherwise, the method for initial attach applies.

The NG-RAN 310 supports resource isolation between slices. NG-RAN 310 resource isolation may be achieved by means of RRM policies and protection mechanisms that should avoid that shortage of shared resources if one slice breaks the service level agreement for another slice. In some implementations, it is possible to fully dedicate NG-RAN 310 resources to a certain slice. How NG-RAN 310 supports resource isolation is implementation dependent.

Some slices may be available only in part of the network. Awareness in the NG-RAN 310 of the slices supported in the cells of its neighbors may be beneficial for inter-frequency mobility in connected mode. The slice availability may not change within the UE's registration area. The NG-RAN 310 and the 5GC 320 are responsible to handle a service request for a slice that may or may not be available in a given area. Admission or rejection of access to a slice may depend on factors such as support for the slice, availability of resources, support of the requested service by NG-RAN 310.

The UE 301 may be associated with multiple network slices simultaneously. In case the UE 301 is associated with multiple slices simultaneously, only one signaling connection is maintained, and for intra-frequency cell reselection, the UE 301 tries to camp on the best cell. For inter-frequency cell reselection, dedicated priorities can be used to control the frequency on which the UE 301 camps. The 5GC 320 is to validate that the UE 301 has the rights to access a network slice. Prior to receiving an Initial Context Setup Request message, the NG-RAN 310 may be allowed to apply some provisional or local policies based on awareness of a particular slice that the UE 301 is requesting to access. During the initial context setup, the NG-RAN 310 is informed of the slice for which resources are being requested.

Figure 4:
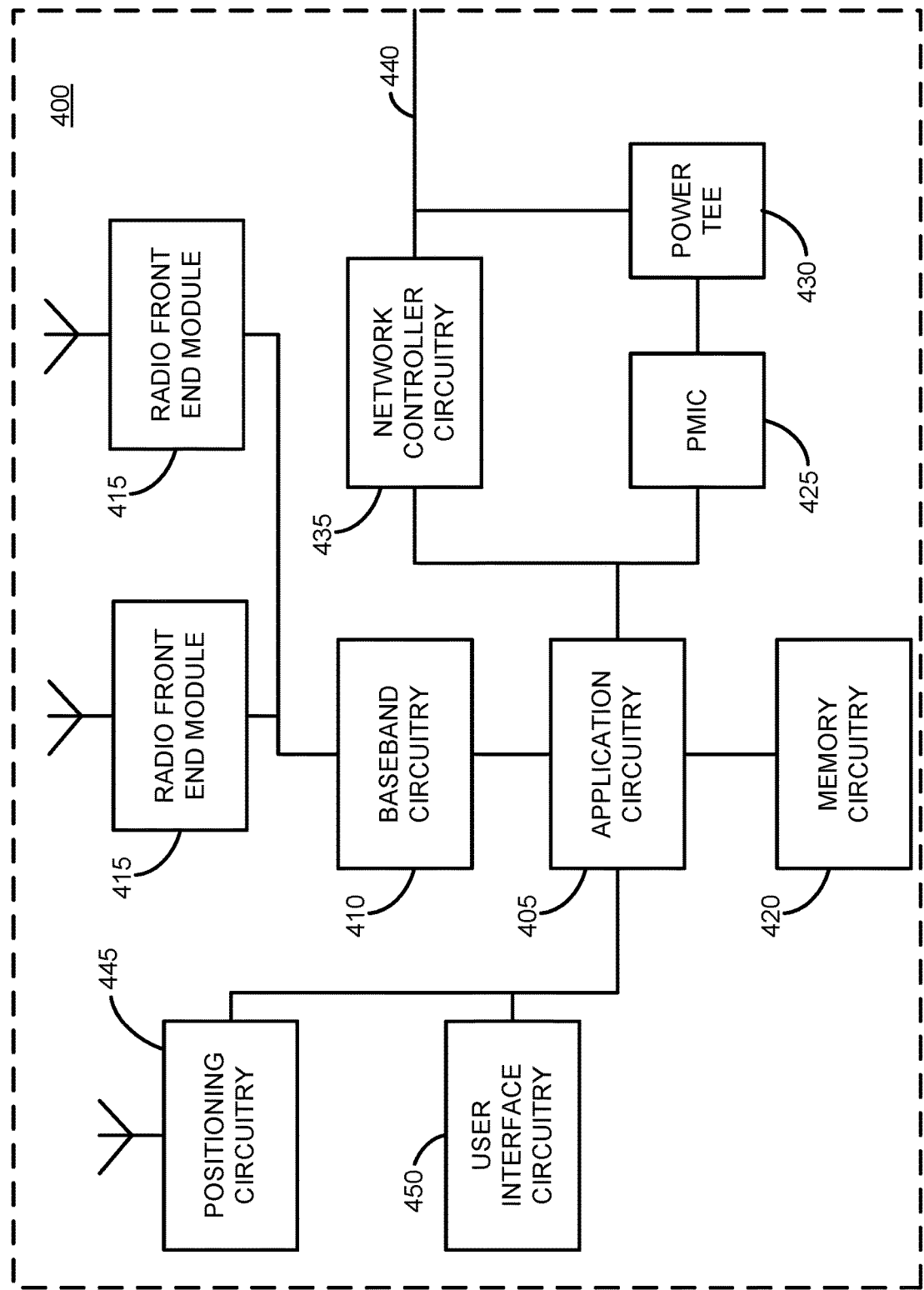
FIG. 4 illustrates an example of infrastructure equipment.

FIG. 4 illustrates an example of infrastructure equipment 400. The infrastructure equipment 400 (or "system 400") may be implemented as a base station, a radio head, a RAN node, such as the RAN nodes 111 shown and described previously, an application server 130, or any other component or device described herein. In other examples, the system 400 can be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface circuitry 450. In some implementations, the system 400 can include additional elements such as, for example, memory, storage, a display, a camera, one or more sensors, or an input/output (I/O) interface, or combinations of them, among others. In other examples, the components described with reference to the system 400 may be included in more than one device. For example, the various circuitries may be separately included in more than one device for CRAN, vBBU, or other implementations.

The application circuitry 405 includes circuitry such as, but not limited to, one or more processors (or processor cores), cache memory, one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers, Universal Serial Bus (USB) interfaces, Mobile Industry Processor Interface (MIPI) interfaces, and Joint Test Access Group (JTAG) test access ports. The processors (or cores) of the application circuitry 405 may be coupled with or can include memory or storage elements and may be configured to execute instructions stored in the memory or storage to enable various applications or operating systems to run on the system 400. In some implementations, the memory or storage elements can include on-chip memory circuitry, which can include any suitable volatile or non-volatile memory, such as DRAM, SRAM, EPROM, EEPROM, Flash memory, solid-state memory, or combinations of them, among other types of memory.

The processor(s) of the application circuitry 405 can include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or combinations of them, among others. In some implementations, the application circuitry 405 can include, or may be, a special-purpose processor or controller configured to carry out the various techniques described here. The baseband circuitry 410 may be implemented, for example, as a solder-down substrate including one or more integrated circuits, a single packaged integrated circuit soldered to a main circuit board or a multi-chip module containing two or more integrated circuits.

The user interface circuitry 450 can include one or more user interfaces designed to enable user interaction with the system 400 or peripheral component interfaces designed to enable peripheral component interaction with the system 400. User interfaces can include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, or combinations of them, among others. Peripheral component interfaces can include, but are not limited to, a nonvolatile memory port, a universal serial bus (USB) port, an audio jack, a power supply interface, among others.

The radio front end modules (RFEMs) 415 can include a millimeter wave (mmWave) RFEM and one or more sub-mmWave radio frequency integrated circuits (RFICs). In some implementations, the one or more sub-mmWave RFICs may be physically separated from the mmWave RFEM. The RFICs can include connections to one or more antennas or antenna arrays (see, e.g., antenna array 611 of FIG. 6), and the RFEM may be connected to multiple antennas. In some implementations, both mmWave and sub-mmWave radio functions may be implemented in the same physical RFEM 415, which incorporates both mmWave antennas and sub-mmWave.

The memory circuitry 420 can include one or more of volatile memory, such as dynamic random access memory (DRAM) or synchronous dynamic random access memory (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. Memory circuitry 420 may be implemented as one or more of solder down packaged integrated circuits, socketed memory modules and plug-in memory cards, for example.

The PMIC 425 can include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to and from the infrastructure equipment 400 using network interface connector 440 using a physical connection, which may be electrical (commonly referred to as a "copper interconnect"), optical, or wireless. The network controller circuitry 435 can include one or more dedicated processors or FPGAs, or both, to communicate using one or more of the aforementioned protocols. In some implementations, the network controller circuitry 435 can include multiple controllers to provide connectivity to other networks using the same or different protocols.

The positioning circuitry 445 includes circuitry to receive and decode signals transmitted or broadcasted by a positioning network of a global navigation satellite system (GNSS). Examples of a GNSS include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS)), among other systems. The positioning circuitry 445 can include various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 445 can include a Micro-Technology for Positioning, Navigation, and Timing (Micro-PNT) IC that uses a master timing clock to perform position tracking and estimation without GNSS assistance. The positioning circuitry 445 may also be part of, or interact with, the baseband circuitry 410 or RFEMs 415, or both, to communicate with the nodes and components of the positioning network. The positioning circuitry 445 may also provide data (e.g., position data, time data) to the application circuitry 405, which may use the data to synchronize operations with various infrastructure (e.g., RAN nodes 111).

The components shown by FIG. 4 may communicate with one another using interface circuitry, which can include any number of bus or interconnect (IX) technologies such as industry standard architecture (ISA), extended ISA (EISA), peripheral component interconnect (PCI), peripheral component interconnect extended (PCIx), PCI express (PCIe), or any number of other technologies. The bus or IX may be a proprietary bus, for example, used in a SoC based system. Other bus or IX systems may be included, such as an I2C interface, an SPI interface, point to point interfaces, and a power bus, among others.

Figure 5:
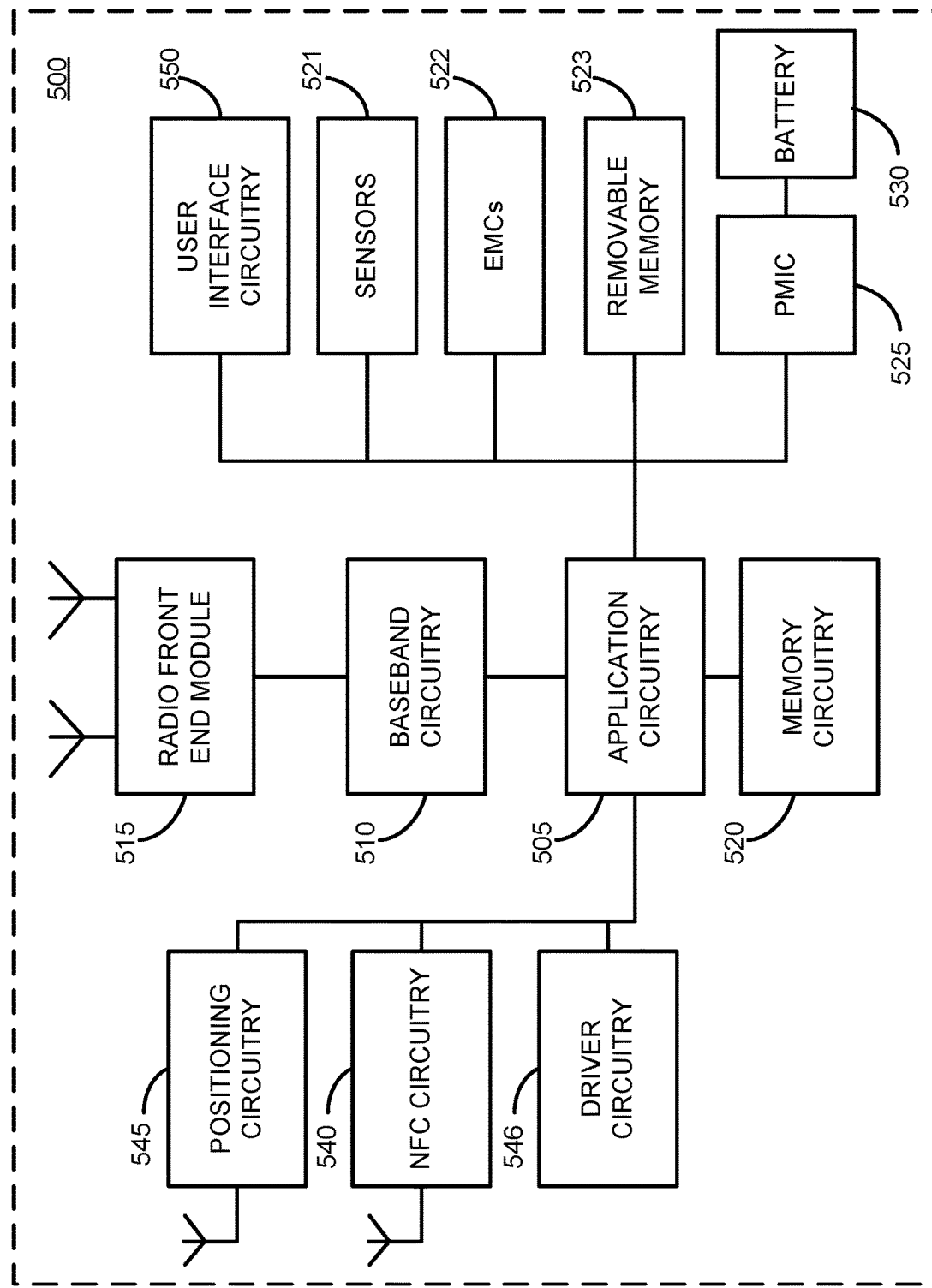
FIG. 5 illustrates an example of a platform or device.

FIG. 5 illustrates an example of a platform 500 (or "device 500"). In some implementations, the computer platform 500 may be suitable for use as UEs 101, 201, 301, application servers 130, or any other component or device discussed herein. The platform 500 can include any combinations of the components shown in the example. The components of platform 500 (or portions thereof) may be implemented as integrated circuits (ICs), discrete electronic devices, or other modules, logic, hardware, software, firmware, or a combination of them adapted in the computer platform 500, or as components otherwise incorporated within a chassis of a larger system. The block diagram of FIG. 5 is intended to show a high level view of components of the platform 500. However, in some implementations, the platform 500 can include fewer, additional, or alternative components, or a different arrangement of the components shown in FIG. 5.

The application circuitry 505 includes circuitry such as, but not limited to, one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or can include memory/storage elements and may be configured to execute instructions stored in the memory or storage to enable various applications or operating systems to run on the system 500. In some implementations, the memory or storage elements may be on-chip memory circuitry, which can include any suitable volatile or non-volatile memory, such as DRAM, SRAM, EPROM, EEPROM, Flash memory, solid-state memory, or combinations of them, among other types of memory.

The processor(s) of application circuitry 505 can include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultralow voltage processor, an embedded processor, some other known processing element, or any suitable combination thereof. In some implementations, the application circuitry 405 can include, or may be, a special-purpose processor/controller to carry out the techniques described herein. In some implementations, the application circuitry 505 may be a part of a system on a chip (SoC) in which the application circuitry 505 and other components are formed into a single integrated circuit, or a single package. In some implementations, the application circuitry 505 can include circuitry such as, but not limited to, one or more a field-programmable devices (FPDs) such as FPGAs; programmable logic devices (PLDs) such as complex PLDs (CPLDs), high-capacity PLDs (HCPLDs); ASICs such as structured ASICs; programmable SoCs (PSoCs), or combinations of them, among others. In some implementations, the application circuitry 505 can include logic blocks or logic fabric, and other interconnected resources that may be programmed to perform various functions, such as the procedures, methods, functions described herein. In some implementations, the application circuitry 505 can include memory cells (e.g., erasable programmable read-only memory (EPROM), electrically erasable programmable read-only memory (EEPROM), flash memory, static memory (e.g., static random access memory (SRAM), or anti-fuses)) used to store logic blocks, logic fabric, data, or other data in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed with regard to FIG. 6.

The RFEMs 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs can include connections to one or more antennas or antenna arrays (see, e.g., antenna array 611 of FIG. 6), and the RFEM may be connected to multiple antennas. In some implementations, both mmWave and sub-mmWave radio functions may be implemented in the same physical RFEM 515, which incorporates both mmWave antennas and sub-mmWave. In some implementations, the RFEMs 515, the baseband circuitry 510, or both are included in a transceiver of the platform 500.

The memory circuitry 520 can include any number and type of memory devices used to provide for a given amount of system memory. As examples, the memory circuitry 520 can include one or more of volatile memory, such as random access memory (RAM), dynamic RAM (DRAM) or synchronous dynamic RAM (SDRAM), and nonvolatile memory (NVM), such as high-speed electrically erasable memory (commonly referred to as Flash memory), phase change random access memory (PRAM), or magnetoresistive random access memory (MRAM), or combinations of them, among others.

In low power implementations, the memory circuitry 520 may be on-die memory or registers associated with the application circuitry 505. To provide for persistent storage of information such as data, applications, operating systems and so forth, memory circuitry 520 can include one or more mass storage devices, which can include, for example, a solid state drive (SSD), hard disk drive (HDD), a micro HDD, resistance change memories, phase change memories, holographic memories, or chemical memories, among others.

The removable memory circuitry 523 can include devices, circuitry, enclosures, housings, ports or receptacles, among others, used to couple portable data storage devices with the platform 500. These portable data storage devices may be used for mass storage purposes, and can include, for example, flash memory cards (e.g., Secure Digital (SD) cards, microSD cards, xD picture cards), and USB flash drives, optical discs, or external HDDs, or combinations of them, among others.

The platform 500 may also include interface circuitry (not shown) for connecting external devices with the platform 500. The external devices connected to the platform 500 using the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (e.g., sensor data) about the detected events to one or more other devices, modules, or subsystems. Examples of such sensors include inertial measurement units (IMUs) such as accelerometers, gyroscopes, or magnetometers; microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other audio capture devices, or combinations of them, among others.

The EMCs 522 include devices, modules, or subsystems whose purpose is to enable the platform 500 to change its state, position, or orientation, or move or control a mechanism, system, or subsystem. Additionally, the EMCs 522 may be configured to generate and send messages or signaling to other components of the platform 500 to indicate a current state of the EMCs 522. Examples of the EMCs 522 include one or more power switches, relays, such as electromechanical relays (EMRs) or solid state relays (SSRs), actuators (e.g., valve actuators), an audible sound generator, a visual warning device, motors (e.g., DC motors or stepper motors), wheels, thrusters, propellers, claws, clamps, hooks, or combinations of them, among other electro-mechanical components. In some implementations, the platform 500 is configured to operate one or more EMCs 522 based on one or more captured events, instructions, or control signals received from a service provider or clients, or both.

In some implementations, the interface circuitry may connect the platform 500 with positioning circuitry 545. The positioning circuitry 545 includes circuitry to receive and decode signals transmitted or broadcasted by a positioning network of a GNSS. In some implementations, the positioning circuitry 545 can include a Micro-PNT IC that uses a master timing clock to perform position tracking or estimation without GNSS assistance. The positioning circuitry 545 may also be part of, or interact with, the baseband circuitry 510 or RFEMs 515, or both, to communicate with the nodes and components of the positioning network. The positioning circuitry 545 may also provide data (e.g., position data, time data) to the application circuitry 505, which may use the data to synchronize operations with various infrastructure (e.g., radio base stations), for turn-by-turn navigation applications, or the like.

In some implementations, the interface circuitry may connect the platform 500 with Near-Field Communication (NFC) circuitry 540. The NFC circuitry 540 is configured to provide contactless, short-range communications based on radio frequency identification (RFID) standards, in which magnetic field induction is used to enable communication between NFC circuitry 540 and NFC-enabled devices external to the platform 500 (e.g., an "NFC touchpoint"). The NFC circuitry 540 includes an NFC controller coupled with an antenna element and a processor coupled with the NFC controller. The NFC controller may be a chip or IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 can include software and hardware elements that operate to control particular devices that are embedded in the platform 500, attached to the platform 500, or otherwise communicatively coupled with the platform 500. The driver circuitry 546 can include individual drivers allowing other components of the platform 500 to interact with or control various input/output (I/O) devices that may be present within, or connected to, the platform 500. For example, the driver circuitry 546 can include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may be included when the platform 500 is capable of being powered by a battery 530, for example, when the device is included in a UE 101, 201, 301.

In some implementations, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback or handover. This can allow the platform 500 to enter a very low power state, where it periodically wakes up to listen to the network and then powers down again. In some implementations, the platform 500 may not receive data in the RRC_Idle state and instead must transition back to RRC_Connected state to receive data. An additional power saving mode may allow a device to be unavailable to the network for periods longer than a paging interval (ranging from seconds to a few hours). During this time, the device may be unreachable to the network and may power down completely. Any data sent during this time may incurs a large delay and it is assumed the delay is acceptable.

A battery 530 may power the platform 500, although, in some implementations the platform 500 may be deployed in a fixed location, and may have a power supply coupled to an electrical grid. The battery 530 may be a lithium ion battery, a metal-air battery, such as a zinc-air battery, an aluminum-air battery, or a lithium-air battery, among others. In some implementations, such as in V2X applications, the battery 530 may be a typical lead-acid automotive battery.

The user interface circuitry 550 includes various input/output (I/O) devices present within, or connected to, the platform 500, and includes one or more user interfaces designed to enable user interaction with the platform 500 or peripheral component interfaces designed to enable peripheral component interaction with the platform 500. The user interface circuitry 550 includes input device circuitry and output device circuitry. Input device circuitry includes any physical or virtual means for accepting an input including one or more physical or virtual buttons (e.g., a reset button), a physical keyboard, keypad, mouse, touchpad, touchscreen, microphones, scanner, or headset, or combinations of them, among others. The output device circuitry includes any physical or virtual means for showing information or otherwise conveying information, such as sensor readings, actuator position(s), or other information. Output device circuitry can include any number or combinations of audio or visual display, including one or more simple visual outputs or indicators (e.g., binary status indicators (e.g., light emitting diodes (LEDs)), multi-character visual outputs, or more complex outputs such as display devices or touchscreens (e.g., Liquid Crystal Displays (LCD), LED displays, quantum dot displays, or projectors), with the output of characters, graphics, or multimedia objects being generated or produced from the operation of the platform 500. The output device circuitry may also include speakers or other audio emitting devices, or printer(s). In some implementations, the sensor circuitry 521 may be used as the input device circuitry (e.g., an image capture device or motion capture device), and one or more EMCs may be used as the output device circuitry (e.g., an actuator to provide haptic feedback). In another example, NFC circuitry comprising an NFC controller coupled with an antenna element and a processing device may be included to read electronic tags or connect with another NFC-enabled device. Peripheral component interfaces can include, but are not limited to, a non-volatile memory port, a USB port, an audio jack, or a power supply interface.

Although not shown, the components of platform 500 may communicate with one another using a suitable bus or interconnect (IX) technology, which can include any number of technologies, including ISA, EISA, PCI, PCIx, PCIe, a Time-Trigger Protocol (TTP) system, a FlexRay system, or any number of other technologies. The bus or IX may be a proprietary bus or IX, for example, used in a SoC based system. Other bus or IX systems may be included, such as an I2C interface, an SPI interface, point-to-point interfaces, and a power bus, among others.

Figure 6:
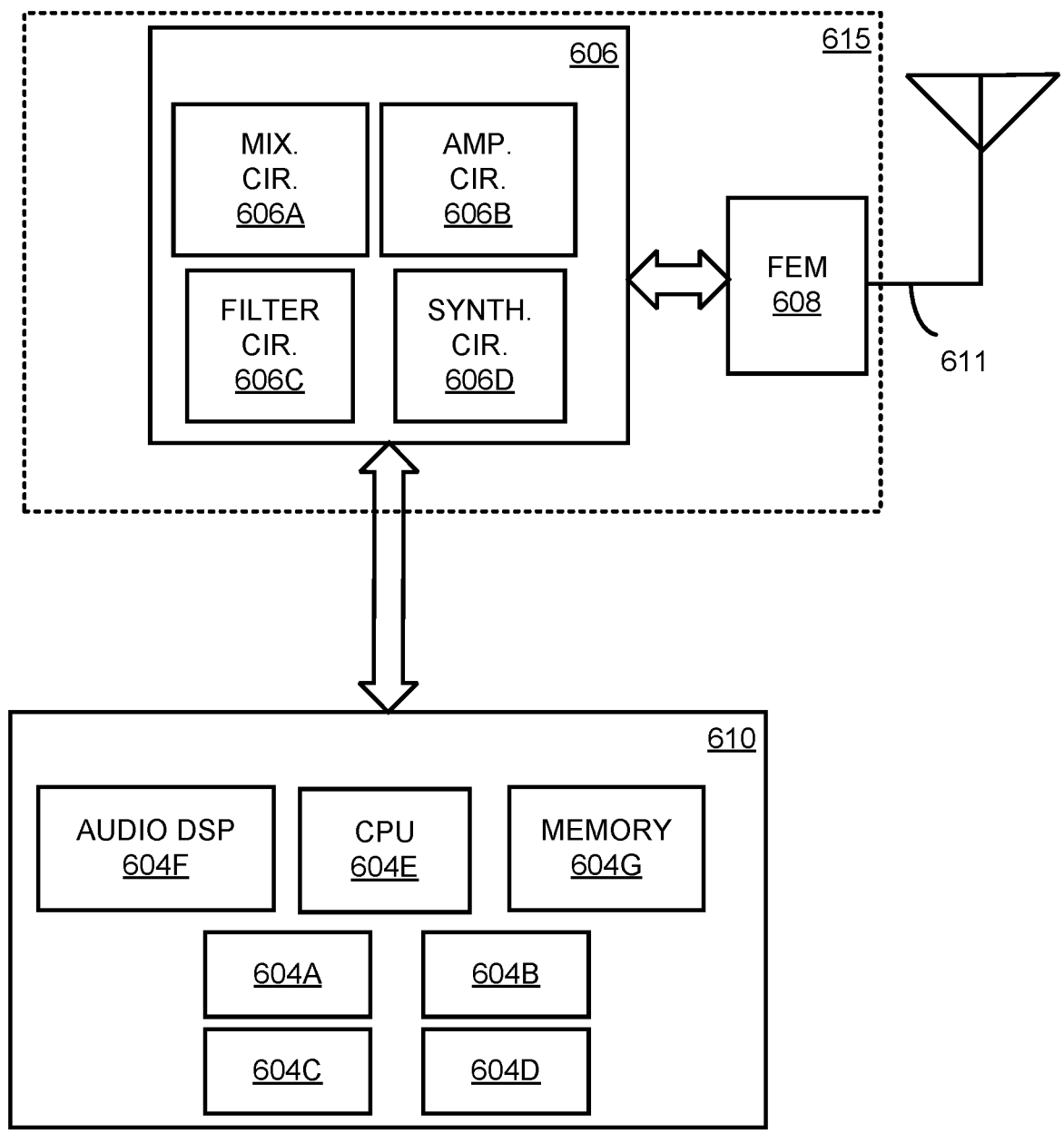
FIG. 6 illustrates example components of baseband circuitry and radio front end circuitry.

FIG. 6 illustrates example components of baseband circuitry 610 and radio front end modules (RFEM) 615. The baseband circuitry 610 can correspond to the baseband circuitry 410 and 510 of FIGS. 4 and 5, respectively. The RFEM 615 can correspond to the RFEM 415 and 515 of FIGS. 4 and 5, respectively. As shown, the RFEMs 615 can include Radio Frequency (RF) circuitry 606, front-end module (FEM) circuitry 608, and antenna array 611 coupled together. In some implementations, the RFEMs 615, the baseband circuitry 610, or both are included in a transceiver.

The baseband circuitry 610 includes circuitry configured to carry out various radio or network protocol and control functions that enable communication with one or more radio networks using the RF circuitry 606. The radio control functions can include, but are not limited to, signal modulation and demodulation, encoding and decoding, and radio frequency shifting. In some implementations, modulation and demodulation circuitry of the baseband circuitry 610 can include Fast-Fourier Transform (FFT), precoding, or constellation mapping and demapping functionality. In some implementations, encoding and decoding circuitry of the baseband circuitry 610 can include convolution, tail-biting convolution, turbo, Viterbi, or Low Density Parity Check (LDPC) encoder and decoder functionality. Modulation and demodulation and encoder and decoder functionality are not limited to these examples and can include other suitable functionality in other examples. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry (e.g., the application circuitry 405, 505 shown in FIGS. 4 and 5) for generation and processing of the baseband signals and for controlling operations of the RF circuitry 606. The baseband circuitry 610 may handle various radio control functions.

The aforementioned circuitry and control logic of the baseband circuitry 610 can include one or more single or multi-core processors. For example, the one or more processors can include a 3G baseband processor 604A, a 4G or LTE baseband processor 604B, a 5G or NR baseband processor 604C, or some other baseband processor(s) 604D for other existing generations, generations in development or to be developed in the future (e.g., sixth generation (6G)). In some implementations, some or all of the functionality of baseband processors 604A-D may be included in modules stored in the memory 604G and executed using one or more processors such as a Central Processing Unit (CPU) 604E. In some implementations, some or all of the functionality of baseband processors 604A-D may be provided as hardware accelerators (e.g., FPGAs or ASICs) loaded with the appropriate bit streams or logic blocks stored in respective memory cells. In some implementations, the memory 604G may store program code of a real-time OS (RTOS) which, when executed by the CPU 604E (or other processor), is to cause the CPU 604E (or other processor) to manage resources of the baseband circuitry 610, schedule tasks, or carry out other operations. In some implementations, the baseband circuitry 610 includes one or more audio digital signal processors (DSP) 604F. An audio DSP 604F can include elements for compression and decompression and echo cancellation and can include other suitable processing elements.

In some implementations, each of the processors 604A-604E includes respective memory interfaces to send and receive data to and from the memory 604G. The baseband circuitry 610 may further include one or more interfaces to communicatively couple to other circuitries or devices, such as an interface to send and receive data to and from memory external to the baseband circuitry 610; an application circuitry interface to send and receive data to and from the application circuitry 405, 505 of FIGS. 4 and 5); an RF circuitry interface to send and receive data to and from RF circuitry 606 of FIG. 6; a wireless hardware connectivity interface to send and receive data to and from one or more wireless hardware elements (e.g., Near Field Communication (NFC) components, Bluetooth®/Bluetooth® Low Energy components, Wi-Fi components, and/or the like); and a power management interface to send and receive power or control signals to and from the PMIC 525.

In some implementations (which may be combined with the above described examples), the baseband circuitry 610 includes one or more digital baseband systems, which are coupled with one another using an interconnect subsystem and to a CPU subsystem, an audio subsystem, and an interface subsystem. The digital baseband subsystems may also be coupled to a digital baseband interface and a mixed-signal baseband subsystem using another interconnect subsystem. Each of the interconnect subsystems can include a bus system, point-to-point connections, network-on-chip (NOC) structures, or some other suitable bus or interconnect technology, such as those discussed herein. The audio subsystem can include DSP circuitry, buffer memory, program memory, speech processing accelerator circuitry, data converter circuitry such as analog-to-digital and digital-to-analog converter circuitry, analog circuitry including one or more of amplifiers and filters, among other components. In some implementations, the baseband circuitry 610 can include protocol processing circuitry with one or more instances of control circuitry (not shown) to provide control functions for the digital baseband circuitry or radio frequency circuitry (e.g., the radio front end modules 615).

In some implementations, the baseband circuitry 610 includes individual processing device(s) to operate one or more wireless communication protocols (e.g., a "multi-protocol baseband processor" or "protocol processing circuitry") and individual processing device(s) to implement PHY layer functions. In some implementations, the PHY layer functions include the aforementioned radio control functions. In some implementations, the protocol processing circuitry operates or implements various protocol layers or entities of one or more wireless communication protocols. For example, the protocol processing circuitry may operate LTE protocol entities or 5G NR protocol entities, or both, when the baseband circuitry 610 or RF circuitry 606, or both, are part of mmWave communication circuitry or some other suitable cellular communication circuitry. In this example, the protocol processing circuitry can operate MAC, RLC, PDCP, SDAP, RRC, and NAS functions. In some implementations, the protocol processing circuitry may operate one or more IEEE-based protocols when the baseband circuitry 610 or RF circuitry 606, or both, are part of a Wi-Fi communication system. In this example, the protocol processing circuitry can operate Wi-Fi MAC and logical link control (LLC) functions. The protocol processing circuitry can include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed herein may be implemented, for example, as a solder-down substrate including one or more integrated circuits (ICs), a single packaged IC soldered to a main circuit board or a multi-chip module containing two or more ICs. In some implementations, the components of the baseband circuitry 610 may be suitably combined in a single chip or chipset, or disposed on a same circuit board. In some implementations, some or all of the constituent components of the baseband circuitry 610 and RF circuitry 606 may be implemented together such as, for example, a system on a chip (SoC) or System-in-Package (SiP). In some implementations, some or all of the constituent components of the baseband circuitry 610 may be implemented as a separate SoC that is communicatively coupled with and RF circuitry 606 (or multiple instances of RF circuitry 606). In some implementations, some or all of the constituent components of the baseband circuitry 610 and the application circuitry 405, 505 may be implemented together as individual SoCs mounted to a same circuit board (e.g., a "multi-chip package").

In some implementations, the baseband circuitry 610 may provide for communication compatible with one or more radio technologies. For example, the baseband circuitry 610 may support communication with an E-UTRAN or other WMAN, a WLAN, or a WPAN. Examples in which the baseband circuitry 610 is configured to support radio communications of more than one wireless protocol may be referred to as multi-mode baseband circuitry.

The RF circuitry 606 may enable communication with wireless networks using modulated electromagnetic radiation through a non-solid medium. In some implementations, the RF circuitry 606 can include switches, filters, or amplifiers, among other components, to facilitate the communication with the wireless network. The RF circuitry 606 can include a receive signal path, which can include circuitry to down-convert RF signals received from the FEM circuitry 608 and provide baseband signals to the baseband circuitry 610. The RF circuitry 606 may also include a transmit signal path, which can include circuitry to up-convert baseband signals provided by the baseband circuitry 610 and provide RF output signals to the FEM circuitry 608 for transmission.

The receive signal path of the RF circuitry 606 includes mixer circuitry 606a, amplifier circuitry 606b and filter circuitry 606c. In some implementations, the transmit signal path of the RF circuitry 606 can include filter circuitry 606c and mixer circuitry 606a. The RF circuitry 606 also includes synthesizer circuitry 606d for synthesizing a frequency for use by the mixer circuitry 606a of the receive signal path and the transmit signal path. In some implementations, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 610 for further processing. In some implementations, the output baseband signals may be zero-frequency baseband signals, although this is not a requirement. In some implementations, the mixer circuitry 606a of the receive signal path may comprise passive mixers.

In some implementations, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 610 and may be filtered by filter circuitry 606c.

In some implementations, the mixer circuitry 606a of the receive signal path and the mixer circuitry 606a of the transmit signal path can include two or more mixers and may be arranged for quadrature downconversion and upconversion, respectively. In some implementations, the mixer circuitry 606a of the receive signal path and the mixer circuitry 606a of the transmit signal path can include two or more mixers and may be arranged for image rejection (e.g., Hartley image rejection). In some implementations, the mixer circuitry 606a of the receive signal path and the mixer circuitry 606a of the transmit signal path may be arranged for direct downconversion and direct upconversion, respectively. In some implementations, the mixer circuitry 606a of the receive signal path and the mixer circuitry 606a of the transmit signal path may be configured for super-heterodyne operation.

In some implementations, the output baseband signals and the input baseband signals may be analog baseband signals. In some implementations, the output baseband signals and the input baseband signals may be digital baseband signals, and the RF circuitry 606 can include analog-to-digital converter (ADC) and digital-to-analog converter (DAC) circuitry and the baseband circuitry 610 can include a digital baseband interface to communicate with the RF circuitry 606. In some dual-mode examples, a separate radio IC circuitry may be provided for processing signals for each spectrum, although the techniques described here are not limited in this respect.

In some implementations, synthesizer circuitry 606d may be configured to generate a carrier frequency as the output frequency, while in other examples, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency may be a LO frequency (fLO). In some implementations, the RF circuitry 606 can include an IQ or polar converter.

The FEM circuitry 608 can include a receive signal path, which can include circuitry configured to operate on RF signals received from antenna array 611, amplify the received signals and provide the amplified versions of the received signals to the RF circuitry 606 for further processing. The FEM circuitry 608 may also include a transmit signal path, which can include circuitry configured to amplify signals for transmission provided by the RF circuitry 606 for transmission by one or more of antenna elements of antenna array 611. The amplification through the transmit or receive signal paths may be done solely in the RF circuitry 606, solely in the FEM circuitry 608, or in both the RF circuitry 606 and the FEM circuitry 608.

In some implementations, the FEM circuitry 608 can include a TX/RX switch to switch between transmit mode and receive mode operation. The FEM circuitry 608 can include a receive signal path and a transmit signal path. The receive signal path of the FEM circuitry 608 can include an LNA to amplify received RF signals and provide the amplified received RF signals as an output (e.g., to the RF circuitry 606). The transmit signal path of the FEM circuitry 608 can include a power amplifier (PA) to amplify input RF signals (e.g., provided by RF circuitry 606), and one or more filters to generate RF signals for subsequent transmission by one or more antenna elements of the antenna array 611.

The antenna array 611 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted using the antenna elements of the antenna array 611 including one or more antenna elements (not shown). The antenna elements may be omnidirectional, directional, or a combination thereof. The antenna elements may be formed in a multitude of arranges as are known and/or discussed herein. The antenna array 611 may comprise microstrip antennas or printed antennas that are fabricated on the surface of one or more printed circuit boards. The antenna array 611 may be formed as a patch of metal foil (e.g., a patch antenna) in a variety of shapes, and may be coupled with the RF circuitry 606 and/or FEM circuitry 608 using metal transmission lines or the like.

Processors of the application circuitry 405/505 and processors of the baseband circuitry 610 may be used to execute elements of one or more instances of a protocol stack. For example, processors of the baseband circuitry 610, alone or in combination, may execute Layer 3, Layer 2, or Layer 1 functionality, while processors of the application circuitry 405, 505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 7:
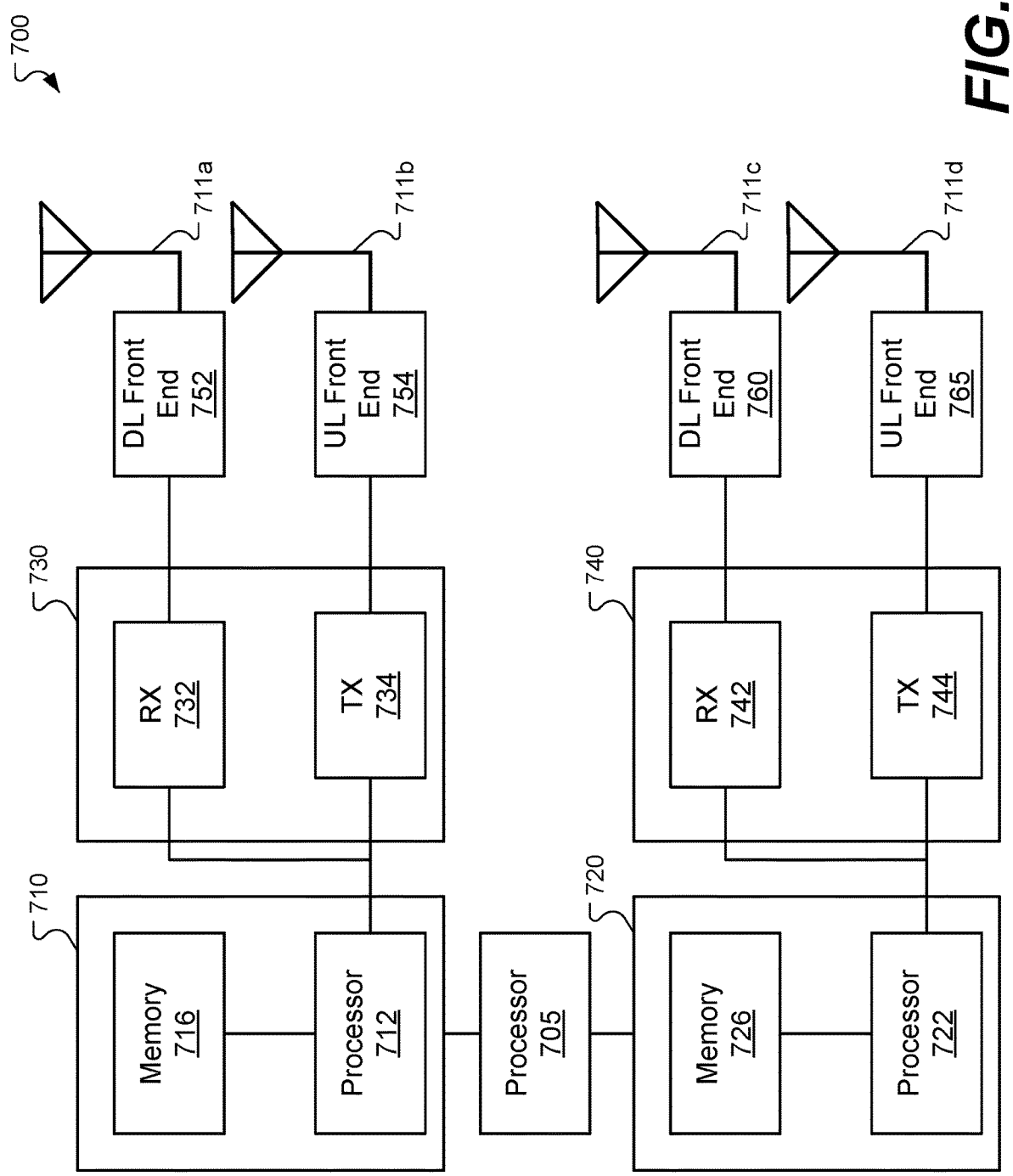
FIG. 7 illustrates example components of cellular communication circuitry.

FIG. 7 illustrates example components of communication circuitry 700. In some implementations, the communication circuitry 700 may be implemented as part of the system 400 or the platform 500 shown in FIGS. 4 and 5. The communication circuitry 700 may be communicatively coupled (e.g., directly or indirectly) to one or more antennas, such as antennas 711a, 711b, 711c, and 711d. In some implementations, the communication circuitry 700 includes or is communicatively coupled to dedicated receive chains, processors, or radios, or combinations of them, for multiple RATs (e.g., a first receive chain for LTE and a second receive chain for 5G NR). For example, as shown in FIG. 7, the communication circuitry 700 includes a modem 710 and a modem 720, which may correspond to or be a part of the baseband circuitry 410 and 510 of FIGS. 4 and 5. The modem 710 may be configured for communications according to a first RAT, such as LTE or LTE-A, and the modem 720 may be configured for communications according to a second RAT, such as 5G NR. In some implementations, a processor 705, such as an application processor can interface with the modems 710, 720.

The modem 710 includes one or more processors 712 and a memory 716 in communication with the processors 712. The modem 710 is in communication with a radio frequency (RF) front end 730, which may correspond to or be a part of to the RFEM 415 and 515 of FIGS. 4 and 5. The RF front end 730 can include circuitry for transmitting and receiving radio signals. For example, the RF front end 730 includes receive circuitry (RX) 732 and transmit circuitry (TX) 734. In some implementations, the receive circuitry 732 is in communication with a DL front end 752, which can include circuitry for receiving radio signals from one or more antennas 711a. The transmit circuitry 734 is in communication with a UL front end 754, which is coupled with one or more antennas 711b.

Similarly, the modem 720 includes one or more processors 722 and a memory 726 in communication with the one or more processors 722. The modem 720 is in communication with an RF front end 740, which may correspond to or be a part of to the RFEM 415 and 515 of FIGS. 4 and 5. The RF front end 740 can include circuitry for transmitting and receiving radio signals. For example, the RF front end 740 includes receive circuitry 742 and transmit circuitry 744. In some implementations, the receive circuitry 742 is in communication with a DL front end 760, which can include circuitry for receiving radio signals from one or more antennas 711c. The transmit circuitry 744 is in communication with a UL front end 765, which is coupled with one or more antennas 711d. In some implementations, one or more front-ends can be combined. For example, a RF switch can selectively couple the modems 710, 720 to a single UL front end 772 for transmitting radio signals using one or more antennas.

The modem 710 can include hardware and software components for time division multiplexing UL data (e.g., for NSA NR operations), as well as the various other techniques described herein. The processors 712 can include one or more processing elements configured to implement various features described herein, such as by executing program instructions stored on the memory 716 (e.g., a non-transitory computer-readable memory medium). In some implementations, the processor 712 may be configured as a programmable hardware element, such as a FPGA or an ASIC. In some implementations, the processors 712 can include one or more ICs that are configured to perform the functions of processors 712. For example, each IC can include circuitry configured to perform the functions of processors 712.

The modem 720 can include hardware and software components for time division multiplexing UL data (e.g., for NSA NR operations), as well as the various other techniques described herein. The processors 722 can include one or more processing elements configured to implement various features described herein, such as by executing instructions stored on the memory 726 (e.g., a non-transitory computer-readable memory medium). In some implementations, the processor 722 may be configured as a programmable hardware element, such as a FPGA or an ASIC. In some implementations, the processor 722 can include one or more ICs that are configured to perform the functions of processors 722.

Figure 8:
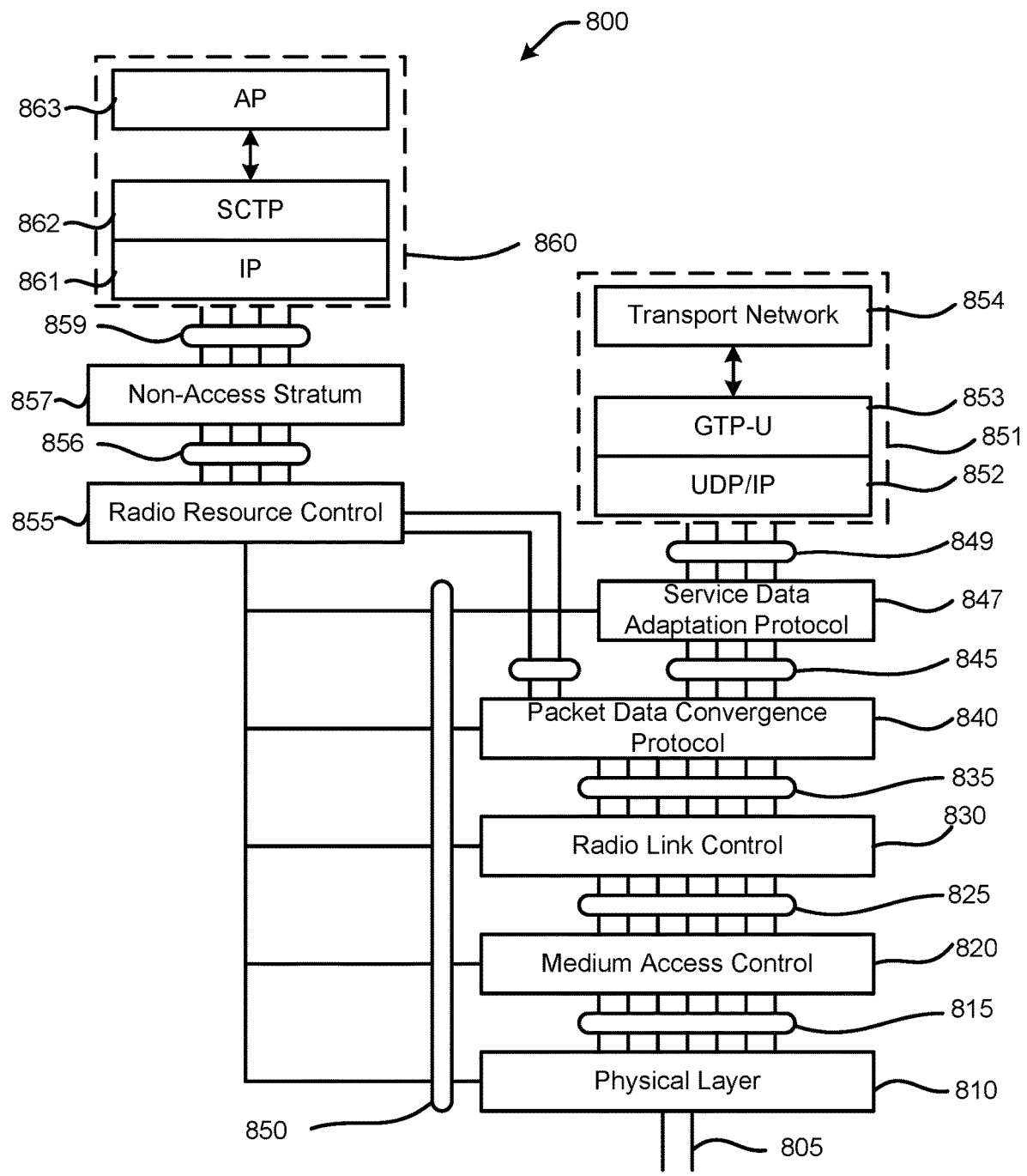
FIG. 8 illustrates example protocol functions that can be implemented in wireless communication systems.

FIG. 8 illustrates various protocol functions that may be implemented in a wireless communication device. In particular, FIG. 8 includes an arrangement 800 showing interconnections between various protocol layers/entities. The following description of FIG. 8 is provided for various protocol layers and entities that operate in conjunction with the 5G NR system standards and the LTE system standards, but some or all of the aspects of FIG. 8 may be applicable to other wireless communication network systems as well.

The protocol layers of arrangement 800 can include one or more of PHY 810, MAC 820, RLC 830, PDCP 840, SDAP 847, RRC 855, and NAS layer 857, in addition to other higher layer functions not illustrated. The protocol layers can include one or more service access points (e.g., items 859, 856, 850, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 can include one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding and decoding of the transport channels, modulation and demodulation of physical channels, interleaving, rate matching, mapping onto physical channels, and MIMO antenna processing. In some implementations, an instance of PHY 810 may process requests from and provide indications to an instance of MAC 820 using one or more PHY-SAP 815. In some implementations, requests and indications communicated using PHY-SAP 815 may comprise one or more transport channels.

Instance(s) of MAC 820 may process requests from, and provide indications to, an instance of RLC 830 using one or more MAC-SAPs 825. These requests and indications communicated using the MAC-SAP 825 can include one or more logical channels. The MAC 820 may perform mapping between the logical channels and transport channels, multiplexing of MAC SDUs from one or more logical channels onto transport blocks (TBs) to be delivered to PHY 810 using the transport channels, de-multiplexing MAC SDUs to one or more logical channels from TBs delivered from the PHY 810 using transport channels, multiplexing MAC SDUs onto TBs, scheduling information reporting, error correction through HARQ, and logical channel prioritization.

Instance(s) of RLC 830 may process requests from and provide indications to an instance of PDCP 840 using one or more radio link control service access points (RLC-SAP) 835. These requests and indications communicated using RLC-SAP 835 can include one or more RLC channels. The RLC 830 may operate in a plurality of modes of operation, including: Transparent Mode (TM), Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 or instance(s) of SDAP 847, or both, using one or more packet data convergence protocol service access points (PDCP-SAP) 845. These requests and indications communicated using PDCP-SAP 845 can include one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, or integrity verification).

Instance(s) of SDAP 847 may process requests from and provide indications to one or more higher layer protocol entities using one or more SDAP-SAP 849. These requests and indications communicated using SDAP-SAP 849 can include one or more QoS flows. The SDAP 847 may map QoS flows to data radio bearers (DRBs), and vice versa, and may also mark QoS flow identifiers (QFIs) in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In some implementations, the SDAP 847 may only be used in NR implementations and may not be used in LTE implementations.

The RRC 855 may configure, using one or more management service access points (M-SAP), aspects of one or more protocol layers, which can include one or more instances of PHY 810, MAC 820, RLC 830, PDCP 840 and SDAP 847. In some implementations, an instance of RRC 855 may process requests from and provide indications to one or more NAS entities 857 using one or more RRC-SAPs 856. The main services and functions of the RRC 855 can include broadcast of system information (e.g., included in master information blocks (MIBs) or system information blocks (SIBs) related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more information elements, which may each comprise individual data fields or data structures.

The NAS 857 may form the highest stratum of the control plane between the UE 101 and the AMF 321. The NAS 857 may support the mobility of the UEs 101 and the session management procedures to establish and maintain IP connectivity between the UE 101 and a P-GW in LTE systems.

In some implementations, one or more protocol entities of arrangement 800 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In some implementations, one or more protocol entities that may be implemented in one or more of UE 101, gNB 111, AMF 321, among others, may communicate with a respective peer protocol entity that may be implemented in or on another device using the services of respective lower layer protocol entities to perform such communication. In some implementations, a gNB-CU of the gNB 111 may host the RRC 855, SDAP 847, and PDCP 840 of the gNB that controls the operation of one or more gNB-DUs, and the gNB-DUs of the gNB 111 may each host the RLC 830, MAC 820, and PHY 810 of the gNB 111.

In some implementations, a control plane protocol stack can include, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863.

In some implementations, such as NR implementations, the AP 863 may be an NG application protocol layer (NGAP or NG-AP) 863 for the NG interface 113 defined between the NG-RAN node 111 and the AMF 321, or the AP 863 may be an Xn application protocol layer (XnAP or Xn-AP) 863 for the Xn interface 112 that is defined between two or more RAN nodes 111.

The NG-AP 863 may support the functions of the NG interface 113 and may comprise elementary procedures (EPs). An NG-AP EP may be a unit of interaction between the NG-RAN node 111 and the AMF 321. The NG-AP 863 services can include two groups: UE-associated services (e.g., services related to a UE 101) and non-UE-associated services (e.g., services related to the whole NG interface instance between the NG-RAN node 111 and AMF 321). These services can include functions such as, but not limited to: a paging function for the sending of paging requests to NG-RAN nodes 111 involved in a particular paging area; a UE context management function for allowing the AMF 321 to establish, modify, or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages using NG interface or cancel ongoing broadcast of warning messages; a configuration transfer function for requesting and transferring of RAN configuration information (e.g., SON information or performance measurement (PM) data) between two RAN nodes 111 using CN 120, or combinations of them, among others.

The XnAP 863 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE context retrieval and UE context release procedures, RAN paging procedures, or dual connectivity related procedures, among others. The XnAP global procedures may comprise procedures that are not related to a specific UE 101, such as Xn interface setup and reset procedures, NG-RAN update procedures, or cell activation procedures, among others.

In LTE implementations, the AP 863 may be an S1 Application Protocol layer (S1-AP) 863 for the S1 interface 113 defined between an E-UTRAN node 111 and an MME, or the AP 863 may be an X2 application protocol layer (X2AP or X2-AP) 863 for the X2 interface 112 that is defined between two or more E-UTRAN nodes 111.

The S1 Application Protocol layer (S1-AP) 863 may support the functions of the S1 interface, and similar to the NG-AP discussed previously, the S1-AP can include S1-AP EPs. An S1-AP EP may be a unit of interaction between the E-UTRAN node 111 and an MME 221 within an LTE CN 120. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and can include X2AP basic mobility procedures and X2AP global procedures. The X2AP basic mobility procedures can include procedures used to handle UE mobility within the E-UTRAN 120, such as handover preparation and cancellation procedures, SN Status Transfer procedures, UE context retrieval and UE context release procedures, RAN paging procedures, or dual connectivity related procedures, among others. The X2AP global procedures may comprise procedures that are not related to a specific UE 101, such as X2 interface setup and reset procedures, load indication procedures, error indication procedures, or cell activation procedures, among others.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages between the RAN node 111 and the AMF 321/MME 221 based in part on the IP protocol, supported by the IP 861. The Internet Protocol layer (IP) 861 may be used to perform packet addressing and routing functionality. In some implementations the IP layer 861 may use point-to-point transmission to deliver and convey PDUs. In this regard, the RAN node 111 can include L2 and L1 layer communication links (e.g., wired or wireless) with the MME/AMF to exchange information.

In some implementations, a user plane protocol stack can include, in order from highest layer to lowest layer, SDAP 847, PDCP 840, RLC 830, MAC 820, and PHY 810. The user plane protocol stack may be used for communication between the UE 101, the RAN node 111, and UPF 302 in NR implementations or an S-GW 222 and P-GW 223 in LTE implementations. In this example, upper layers 851 may be built on top of the SDAP 847, and can include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 222 may utilize an S1-U interface to exchange user plane data using a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 222 and the P-GW 223 may utilize an S5/S8a interface to exchange user plane data using a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 223.

Moreover, although not shown by FIG. 8, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 610. In some implementations, the IP layer or the application layer, or both, may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components and functions.

Figure 9:
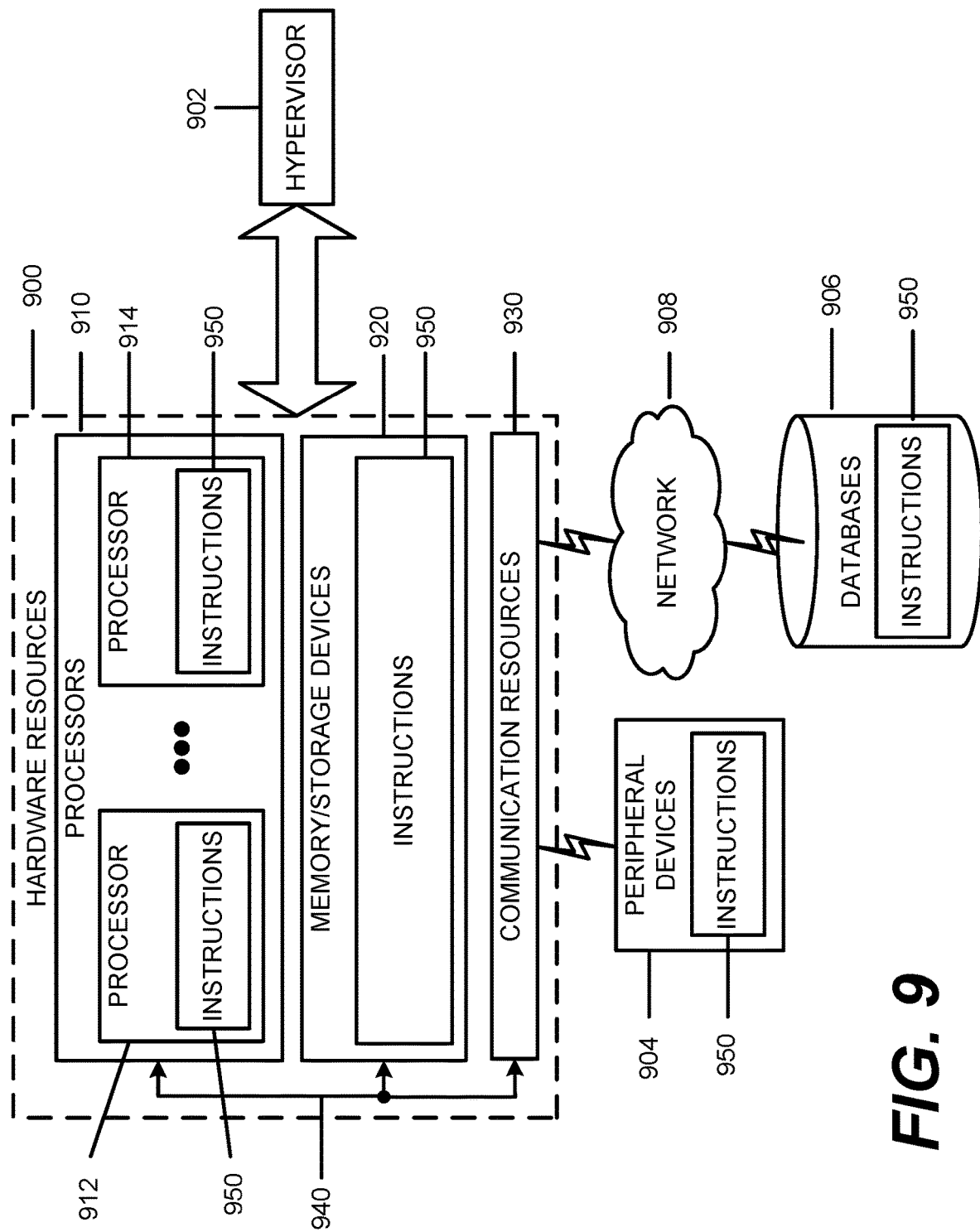
FIG. 9 illustrates an example of a computer system.

FIG. 9 illustrates a block diagram of example of a computer system that includes components for reading instructions from a machine-readable or computer-readable medium (e.g., a non-transitory machine-readable storage medium) and performing any one or more of the techniques described herein. In this example, FIG. 9 shows a diagrammatic representation of hardware resources 900 including one or more processors (or processor cores) 910, one or more memory or storage devices 920, and one or more communication resources 930, each of which may be communicatively coupled using a bus 940. For implementations where node virtualization (e.g., NFV) is utilized, a hypervisor 902 may be executed to provide an execution environment for one or more network slices or sub-slices to utilize the hardware resources 900.

The processors 910 can include a processor 912 and a processor 914. The processor(s) 910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 920 can include main memory, disk storage, or any suitable combination thereof. The memory/storage devices 920 can include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, or solid-state storage, or combinations of them, among others.

The communication resources 930 can include interconnection or network interface components or other suitable devices to communicate with one or more peripheral devices 904 or one or more databases 906 using a network 908. For example, the communication resources 930 can include wired communication components (e.g., for coupling using USB), cellular communication components, NFC components, Bluetooth® (or Bluetooth® Low Energy) components, Wi-Fi components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

NR systems can support coexistence of diverse services and traffic communication in a common carrier. As different services have different requirements and characteristics, multiplexing techniques can be implemented in communication systems such that transmission of packets of each service type is minimally impacted.

This disclosure describes UL multiplexing of transmissions with different requirements such as different reliability and latency requirements. One or more disclosed techniques and mechanisms handle how indications of impacted resources are conveyed to UEs so that ongoing or imminent UL transmissions can be adjusted to avoid adversely impacting other UL transmissions that may occur in shared resources. Transmission of one service type can be more urgent than the other, and can be prioritized over other ongoing transmissions. Several UE-specific downlink control channel signaling mechanisms and corresponding configurations are disclosed to indicate UL transmission cancellation.

UE-specific DCI signaling may cater for individual requirements and resource assignment. Subject to time-frequency granularity of indication of impacted resources, group common signaling may unnecessarily trigger one or more UEs to cancel part of their transmission although their assigned resource do not overlap with the resources of more urgent transmission.

A network can use UE-specific indication mechanisms so that one or more UL transmissions can be made in shared resources, either orthogonal or non-orthogonal manner. Orthogonal transmission refers to the case, when multiple transmissions are made in overlapping time-frequency-code resources. By non-orthogonal transmission, it is assumed that at least one of time resource, frequency resource, code can be overlapping or common between multiple transmissions.

UE-specific control channel signaling, in particular DCI format content design and configurations, can be used to convey UL transmission cancellation indication to a UE. In some implementations, the UE can be triggered based on a power control parameter as a function of an active BWP. A configured RNTI can be used for an UL grant where one or more transmission parameters can be implicitly obtained based on the RNTI detected.

Unless mentioned otherwise, durations mentioned herein can be one or more slots, one or more symbols, or a combination thereof. UL coexistence may occur in licensed and unlicensed band either below or above 6 GHz, FDD and TDD systems, and in any bandwidth part of a given numerology, such as 15 kHz, 30 kHz, 60 kHz, or 120 kHz. Note that UL transmission cancellation indication can be alternatively called a UL transmission interruption indication or a UL transmission preemption indication. In some implementations, the network can provide one or more search spaces associated with a CORESET where DL control channel signaling, such as UL transmission cancellation indication or UL grant, can be monitored. Although in some examples, UE-specific indication is used, similar PDCCH monitoring behaviors, search space set configuration can be used for group-common indication as well. For example, UL cancellation indication can be in a group-common DCI message.

A UE in some implementations is not required to monitor for any UL cancellation indications before receiving a UL grant for an uplink transmission, e.g., PUSCH transmission. The UE can be configured to monitor for one or more UL grant cancellation indications upon successful detection of a UL grant. The following provides activation, configuration, and content design of such transmission cancellation indication. Some examples below are provided in the context of PUSCH transmission cancellation. However, similar considerations can be made, for other ongoing or imminent UL transmissions, such as PUCCH, PRACH, and SRS, after the UE is triggered for such transmission, either semi-statically or dynamically or by a combination of such signaling. In some implementations, UE may receive higher layer signaling to enable or disable cancellation of PUCCH, PRACH, SRS, or a combination thereof. If disabled, the UE can assume that the PUCCH, PRACH, or SRS may not be cancelled, e.g., even if a UL CI indicates a resource that includes the indicated resource of the PUCCH, PRACH, or SRS.

In some implementations, a UE is configured by RRC signaling to monitor for a UL transmission cancellation indication (CI), UL transmission preemption indication (PI), or UL transmission rescheduling indication. A higher layer parameter UL CI=ON or OFF can be used to activate monitoring of UL preemption or cancellation indication after UE receives the grant (e.g., successful decoding of the DCI). Such characterization may require considerations regarding the UE processing time (e.g., DCI decoding time), e.g., N2 being the number of OFDM symbols required for UE processing from the end of PDCCH containing the UL grant to the earliest possible start of the corresponding PUSCH transmission from a UE perspective.

In another example, a UL grant in a PDCCH may contain a field to trigger monitoring for UL transmission cancellation indications. For example, a bit-field in a PDCCH message containing a UL grant can be 1 or 0 (or vice versa) to indicate to the UE to monitor for UL PI or not monitor, respectively. In another example, a bit-field in a DCI containing a UL grant can be 1 or 0 (or vice versa) to indicate to the UE whether the scheduled PUSCH (containing a first TB or associated with first HARQ PID) by the DCI can be cancelled by another subsequent DCI, e.g., another UL grant (received for the first TB, the first HARQ PID, or for another TB in a PUSCH with a different HARQ PID) or a group common DCI format. In some implementations, a second PUSCH of a UE can be prioritized over a first PUSCH of a UE, where the DCI for the second PUSCH is received after the DCI for the first PUSCH, and such prioritization of the second PUSCH can be indicated in the DCI that schedules second PUSCH. In some implementations, the DCI scheduling the first PUSCH can indicate to the UE that the first PUSCH can be cancelled by a subsequent DCI.

Figure 10:
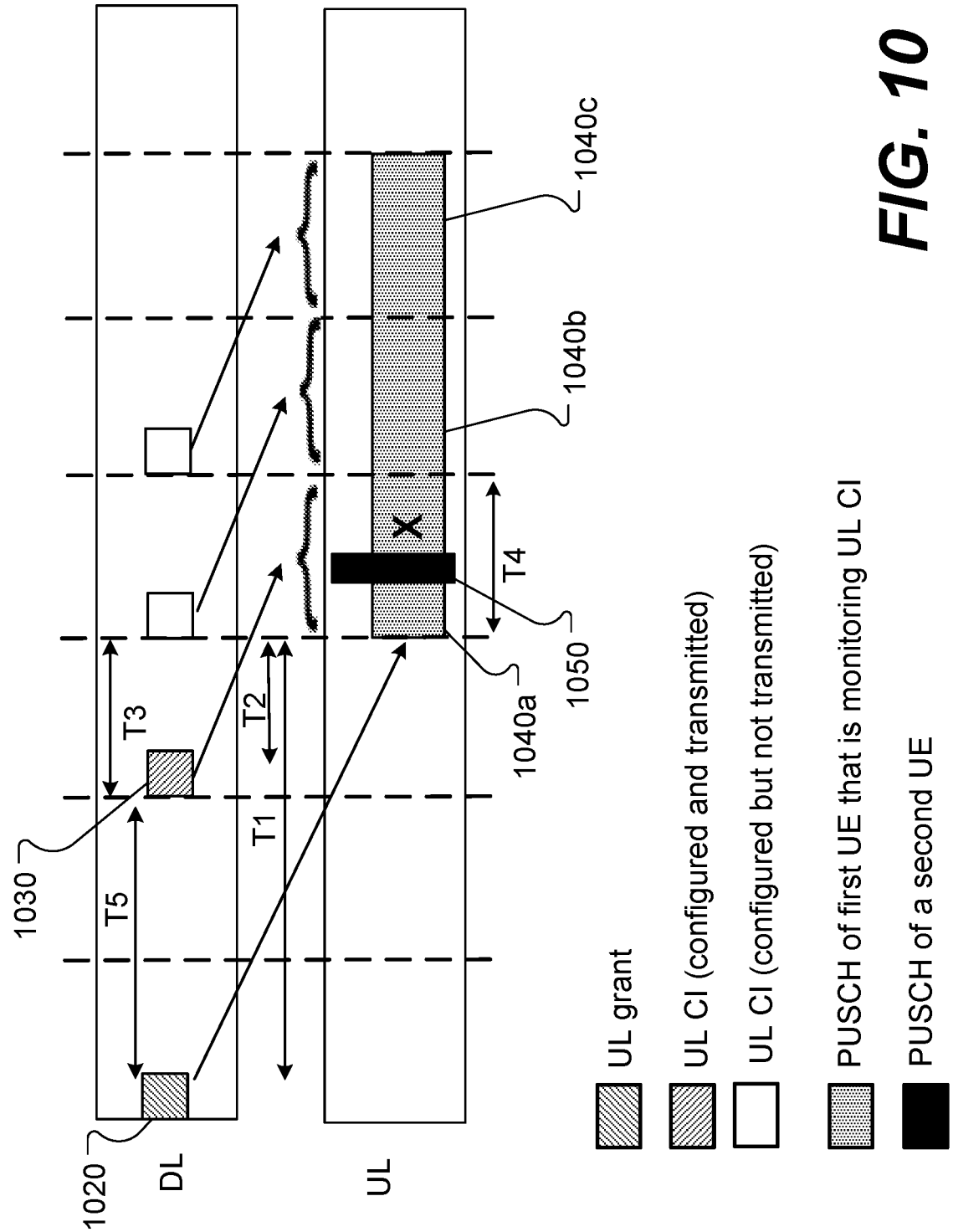
FIG. 10 illustrates an example of a timeline for monitoring for uplink cancellation indications.

FIG. 10 illustrates an example of a timeline 1001 for monitoring for uplink cancellation indications. In this example, a UE receives a UL grant 1020 which indicates that a PUSCH transmission, e.g., PUSCH transmission parts 1040a, 1040b, and 1040c over multiple slots, is to start after time T1 from when the UL grant 1020 was received. The UL grant 1020 can be included in a DCI message transmitted via PDCCH. Time T1 can be measured from the end of a CORESET where the UL grant 1020 is detected to the beginning of the scheduled PUSCH transmission, e.g., initial part 1040a of a scheduled PUSCH transmission. However, in some implementations, T1 can be measured as (number of slots−1)*$N_{symb}$+starting symbol in a slot, where the number of slots is counted from where the UL grant was received and the starting symbol is the starting symbol of the initial part 1040a of a scheduled PUSCH transmission. The $N_{symb}$ parameter denotes the number of symbols in a slot of a given numerology. In some implementations, the $N_{symb}$ parameter is 14 for the case of a normal cyclic prefix (NCP) or 12 for the case of an extended cyclic prefix (ECP). In some implementations, the UL grant 1020 schedules a transmission in a single slot or in multiple slots. In some implementations, the number of slots offset, the starting symbol of the scheduled PUSCH transmission, or both can be dynamically indicated in the UL grant or configured by a higher layer.

The UE starts monitoring for a UL CI after a T5 duration following detection of the UL grant 1020. The UL CI can be received in a DCI message 1030 in a PDCCH. In some implementations, UL CI monitoring can be performed over a window following a UL grant. The window may include M≥1 monitoring occasions for the UL CI. The position of the initial occasion can be obtained as an offset from where the UL grant 1020 was received. In some implementations, the parameter M can be higher-layer configured or can be derived implicitly from a time gap between the end of the UL grant and the end of the scheduled PUSCH or from the duration of PUSCH scheduled.

A parameter T5 can be identified, which can be measured in symbols, slots, or a combination for a given numerology, which indicates the location of the initial UL CI monitoring occasion as an offset from a known reference point. The reference point can be a beginning or an ending of a CORESET where the UL grant 1020 was detected or from the boundary of the slot where UL grant 1020 was detected. In FIG. 10, the parameter T5 is measured from the end of CORESET where the UL grant 1020 was received to the beginning of CORESET where first UL CI is monitored. In some implementations, T5 can be indicated as (number of slots−1)*$N_{symb}$+starting symbol in a slot, where the number of slots is counted from where the UL grant was received and the starting symbol is where the initial symbol of the CORESET for monitoring UL CI is located. One or more parameters related to the indication of T5, such as the number of slots offset from where the UL grant was detected or starting symbols of CORESET where the UL CI is monitored, can be included in UL grant, configured by a higher layer, or a combination or both.

In some implementations, the UE monitors for UL CIs with a periodicity after an initial monitoring occasion of UL CI. A parameter T3 can specify a monitoring period for monitoring successive occasions of one or more UL CIs. T3 can be measured in symbols, slots, or a combination thereof for a given numerology. Parameter T3 can be higher-layer configured, or can be implicitly obtained based on the time gap between the end of the UL grant and the end of the scheduled PUSCH or duration of PUSCH scheduled.

In some implementations, the UE that may receive a UL CI can be scheduled with a longer PUSCH transmission duration, e.g., a UE that receives a transmission with a specific PUSCH mapping type, e.g., mapping type A in the 3GPP NR specifications, where the starting symbol is symbol index 0 in a slot and the length of PUSCH is at least 4 symbols up to 14 symbols. In some implementations, if configured e.g., by higher layer signaling, UEs with a PUSCH duration longer than J symbols may monitor for one or more UL CIs following the UL grant, where J can be an integer, J={2, 3, 4, 5, 6, 7, 8, 9, 10, 12, 13, 14}. In some implementations, time-partitioning of the PUSCH duration can be obtained (e.g., L≥1 time parts) and one UL CI may address one time partition of the PUSCH. UL CI addressing a time partition may indicate all of the scheduled resource within the time partition to be cancelled or a portion of it. In some implementations, each time partition can be further divided in frequency, e.g., J≥1 frequency parts, e.g., the PUSCH BW can be divided into J parts for each time partition. The frequency parts can be counted from top or bottom of PUSCH BW. Each UL CI if detected notifies the UE of cancellation of all or part of the time part.

In some implementations, a PUSCH duration can be divided into L=3 parts, and the UE can monitor for UL CI at M=L=3 occasions. The periodicity of monitoring UL CI is represented by T3 in FIG. 10. The application time after detecting UL CI is represented by T2. T2 can be same, longer, or shorter than a UE processing capability, e.g., a N1 or N2 time identified in the 3GPP NR specifications. The UL CI can be detected in the occasion which triggers the UE to cancel transmission in the time of the allocated resource for a PUSCH transmission. In some implementations, UL CIs are not transmitted in the subsequent monitoring occasions, and the UE can continue transmission of PUSCH in remaining time parts.

In some implementations, the duration of each time part T4 can be the same as, longer than, or shorter than the monitoring period T3. In some implementations, parameter T5 can be implicitly obtained from parameter T1 or one or more parameters defining T1, such as the number of slots offset from the slot where UL grant is received (see, e.g., the K2 value in the 3GPP NR specifications). In some implementations, each of the parameters T1, T2, T3, and T5 can be the same as or larger than the minimum UE processing time for PUSCH preparation procedures, which can be subject to the capability of the UE.

In some implementations, a UL CI can be monitored in a UE-specific or group-common search spaces associated with one or more CORESETs. Parameters such as a monitoring periodicity and a monitoring offset of a UL CI can be configured as part of one or more search spaces associated with one or more CORESETs in a given DL BWP. In some implementations, UL CI monitoring is active only when UE has an imminent or ongoing UL transmission. In some implementations, a UL CI can be monitored with K=>1 aggregation levels. In some implementations, as part of a higher layer parameter such as search-space-config, the UE can be configured based on the following for UL CI monitoring: association of the DCI format with the search space, based on whether it is UE-specific search space or common search space; number of PDCCH candidates according to the supported aggregation levels; PDCCH monitoring periodicity, in symbols or slots, or a combination thereof (e.g., T3); PDCCH monitoring offset, in symbols or slots, or a combination thereof (e.g., T5 or number of slots in calculation of T5, see example mentioned above for calculation of T5); and PDCCH monitoring pattern within a slot, e.g., location of an initial symbol of a CORESET within a slot for monitoring (e.g., which can be used to identify a starting symbol of CORESET in calculation of T5). The UE can be configured to monitor for one or multiple UL CIs. In some implementations, if a UE-specific search space is used, a higher layer parameter USS-DCI-Format can cause the UE to monitor PDCCH for a given DCI format that contains a UL CI. In some implementations, if a common search space is used, a higher layer parameter RNTI-monitoring can cause the UE to monitor PDCCH with the RNTI used for DCI format that contains a UL CI.

UL CI monitoring can be triggered based on events such as the UE receiving a UL grant. In some implementations, although a monitoring configuration can be obtained as part of a search space configuration associated with one or more CORESETs in a DL BWP, the UE does not actively monitor based on the parameters at all times. For example, PDCCH monitoring offset in the configuration for UL CI can be separate from other PDCCH monitored in the search space. In the context of PDCCH monitoring, the offset may indicate a time offset between reception of a UL grant and a beginning of the CORESET where UL CI is monitored, e.g., T5 in FIG. 10. In some implementations, an offset indicates the number of slots from where a UL grant is received and if the starting symbol(s) of the CORESET containing UL CI is not symbol #0 in a slot. A PDCCH monitoring pattern within a slot can be utilized to identify the location of a symbol of a CORESET where to monitor UL CI.

In some implementations, UE can monitor the UL CI in the same or different CORESET than where it received the UL grant that scheduled the transmission. In some implementations, the scheduled PUSCH duration can include one or more repetitions. An implicit way to trigger the UE to monitor for UL CI is if the repetition number K exceeds a predetermined value. For example, if K is equal to or greater than 2, the UE may monitor for UL CI. The monitoring configurations discussed above can be applied to any DCI format that contains a UL CI. In some implementations, a DCI format can signal multiple UL CIs in the same DCI message.

In some implementations, a UE-specific DCI scrambled by C-RNTI or another configured RNTI can be used for a DCI format containing a UL CI. In some implementations, one or more reserved fields can be used in a UL grant such as in a DCI format 0_0 or 0_1, which can be used for UL CI. For example, one bit field can be used, which if 1 (or vice versa), may indicate that a certain time-frequency portion or all of the PUSCH is to be cancelled by the UE. Hence, if that bit-field contains a given value that triggers cancellation, one or more of the rest of the fields in the DCI format may not be valid, e.g., such DCI format may not assign any resource allocation. For example, in the context of FIG. 10, for each of the L parts, UE monitors for the UL grant, whether the bit-value in the field indicates cancellation or not.

A DCI format for UL CI can be scrambled with a specialized RNTI, e.g., a CI-based RNTI, which can be different from a RNTI used to scramble a UL grant. UE can monitor for a UL grant or any other DCI format, such as a compact DCI format with the RNTI for one or more occasions. Detection of a DCI message 1030 with the configured CI-based RNTI can indicate a cancellation of a part or all of the PUSCH transmission scheduled by the original UL grant 1020. In the context of FIG. 10, a detection of a DCI message 1030 with the CI-based RNTI indicates cancellation for at least an initial part 1040a, the remaining parts 1040b, 1040c can also be cancelled without an additional UL CI. In some implementations, the network may transmit the DCI message 1030 with the configured CI-based RNTI to cancel the originally scheduled PUSCH transmissions in parts 1040a-c such that another UE can perform a PUSCH transmission 1050.

In some implementations, the values of L and J are configured by a higher layer. In some implementations, the values of J and L are implicitly derived from a set or number of PRBs and number of symbols scheduled, respectively. A higher-layer configured table, e.g., Table 1, can be used for UE where UE can obtain values of J, L, or both based on a range of values for number of PRBs and range of values for number of symbols. In some implementations, the values of L and J depend on the numerology used in the network. In some implementations, UE may obtain the configuration for the values of L and J based on the active BWP.

TABLE 1

| Value of L | Range of PUSCH duration (symbols) |
| --- | --- |
| 1 | 1 to 4 |
| 2 | 5 to 8 |
| 3 | 9 to 12 or 14 |

In some implementations, a DCI format for providing a UL CI may contain a bitmap of X*Y bits, where X≥1 indicates number of time partitions within each time part, Y≥1 indicates number of frequency parts. The time and frequency granularity can be higher layer configured or implicitly obtained from an allocated resource for PUSCH. In FIG. 10, X=1 and Y=1 is assumed. X and Y can be configured or obtained in a numerology-specific manner, e.g., depend on an active BWP.

In some implementations, a compact DCI format can be conceived for a UL CI. The compact DCI can be monitored with C-RNTI or any other configured RNTI. The compact DCI can indicate one or more of the following: a header or flag if multiple DCI formats have the same size; a field containing XY≥1 bits to indicate which area to cancel transmission and can be a bitmap including X*Y bits; a HARQ ID (note that UE may have multiple UL transmissions going in parallel); carrier indicator; BWP indicator; and zero padding.

In some implementations, one or more of: a new data indicator (NDI) bit field, HARQ ID bit field, modulation and coding scheme (MCS) indication field, or a time or frequency resource allocation field of a UL grant, such as DCI format 0_0 or 0_1, can be used to identify that the DCI is in fact indicating a transmission cancellation, not a grant. For example, for a given HARQ ID, if a NDI bit is toggled, it can indicate a new transmission. However, certain set of entries of MCS table are reserved for retransmission, e.g., MCS with indices 28-31 as described in 3GPP TS 38.214. Now, one of those reserved entries for MCS can be indicated while the NDI bit can be toggled for the same HARQ process ID, which may serve as notification of UL CI for the packet scheduled with the HARQ process ID. The time/frequency resource allocation bit-fields can be used for indicating which time/frequency area to cancel transmission, and can span physical resources beyond the earlier allocated PUSCH. Accordingly, the UE can be expected to cancel all UL transmissions that overlap with the resource region identified by the resource allocation information in the UL CI. In some implementations, if time/frequency resource allocation uses a total of L≥1 bits, then K<=L bits can be used for cancellation indication. As further examples, either the time and frequency domain RA bit-fields can be combined and re-interpreted to determine the time-frequency resources for cancellation or the time and frequency domain RA fields can be interpreted as for a regular UL grant.

A network, in some implementations, can use a rescheduling or revised grant mechanism. An initial UL grant can schedule a packet with a certain status of NDI bit for a given HARQ process. If the UE receives a subsequent UL grant for the same HARQ process with either the same or different NDI bit status over a configured window or set of monitoring occasions, e.g., monitoring configurations described above, before or during the ongoing PUSCH transmission scheduled by an initial UL grant, UE may cancel the ongoing transmission and instead follow the updated grant for the same HARQ process. This technique 'shifts' the PUSCH resource allocation, e.g., to a later time, or alternatively updates the UL grant with a new resource allocation. The updated grant can also be referred to as revised or rescheduling grant. In some implementations, this subsequent grant performs both the operation of a cancelling a transmission and scheduling a transmission. Further, if the UE has been configured with repeated transmissions by an earlier configuration, such a subsequent grant can perform the role of repetition cancellation as well as scheduling a new transmission. The UE can be configured to monitor for the subsequent UL grant at one or more occasions. If the subsequent grant is not received within the configured number of occasions, UE continues with existing operation or follow original grant. A configured number of occasions can be obtained by configuring a time window or duration that comprises the occasions.

Even though the network scheduler may transmit the original grant flexibly at any time, the transmission occasions of the revised grant and how frequent the network can send such revised grant, may not be the same as when the UE monitors for the first grant. Excessive delay in terms of the UL grant reception and UL transmission should be avoided, which is particularly important for UEs supporting low latency traffic, while accounting for the required processing time by the UE to detect and take action on the revised UL grant.

In some implementations, the UE monitors for potential subsequent updated grants, possibly with a finer monitoring granularity, and within a time window, upon detection of a UL grant. Such monitoring periodicity as well as the time window duration can be configured or predefined, and can be obtained as a function of the original (prior to reception of the UL grant) monitoring occasion periodicity, symbols, slots, etc. In some implementations, the window length can be determined based on a duration of the scheduled PUSCH (or PUSCHs in case PUSCH repetitions are configured), e.g., the UE may or may not monitor after the PUSCH transmission (transmissions in case of repetitions) ends. As yet another alternative, the time window duration can be configured to the UE as part of search space set configuration via higher layers (UE-specific RRC signaling).

It is noted that if the network configures the UE with a fine monitoring granularity, e.g., without any change before and after the reception of the grant, the UE can be burdened with unnecessary frequent monitoring, e.g., when no rescheduling needs to be performed. This clarifies the need for a proper choice of the window length as well as the monitoring periodicity.

In some implementations, the UE can be configured with a monitoring periodicity for general scheduling transmission, as well as an additional set of DCI monitoring configuration parameters corresponding to the potential rescheduling operation. These additional configurations can be activated based on an event, e.g., reception of a UL grant, and can be associated with a particular search space set configuration.

The PDCCH monitoring periodicity, offset, and pattern within a slot are currently indicated as part of the configurations for a given search space set. The rescheduling grant may then be monitored in a same or different search space set than the search space set in which the original grant was received, potentially with some additional parameters (such as different monitoring periodicity), e.g., based on a triggering event, when the UE is monitoring for a rescheduling grant.

A given search space and CORESET, for example, can have two monitoring periodicities, one as the default monitoring periodicity, and the other one may only be activated if a certain event happens, e.g., reception of a scheduling grant. The additional set of parameters may include a different monitoring periodicity, offset or pattern relative to the original UL grant.

In some networks, the monitoring related parameters and configurations are configured semi-statistically. Some other networks can dynamically update the search space monitoring configuration. In some implementations, such a dynamic update may not require any dynamic indication and can be activated or deactivated implicitly. A dynamic update of the configurations may enable the cases where in some of the monitoring occasions the UE monitors no candidate, while in some other occasions the UE monitors few additional candidates. With this additional monitoring settings, the UE may monitor more frequently but fewer candidates, e.g., a subset of the candidates it may monitor for a full-blown regular monitoring. In some implementations, it is specified that such additional monitoring behavior, may only be triggered upon detection of a valid UL grant scheduling data transmission in the UL.

The minimum PUSCH preparation time for the subsequent UL grant, considering the time required by the UE to detect and decode the subsequent revised grant as well as the time the UE requires to take action on it (e.g., cancellation of earlier grant and PUSCH preparation and transmission according to the revised grant), depends on the UE processing time capability, and the UE implementation, e.g., N2 defined as the number of OFDM symbols required for UE processing from the end of PDCCH containing the UL grant to the earliest possible start of the corresponding PUSCH transmission from UE perspective.

Activating additional UE monitoring upon reception of a UL grant, may also be extended for the case of UL updated grant for different HARQ process IDs. Accordingly, depending on the HARQ process, if the latter is a rescheduling grant with NDI not being toggled compared to the initial grant, the UE cancels transmission of the PUSCH that corresponds to the initial grant.

In another example, the UE may continue to transmit PUSCH according to both grants for the same HARQ process, irrespective of the NDI toggling stage, as long as the PUSCHs are time division multiplexed e.g., there is no time-domain overlap between the resource allocations by the initial and subsequent grants. Accordingly, the UE follows the scheduling grants, and proceeds with the transmissions where each grant follows its own HARQ timeline.

As described above, one aspect of a rescheduling grant is dynamic adaptation in UE monitoring behavior. A UE can be configured for dynamic PDCCH monitoring, where the monitored PDCCH may change (e.g., alter, update, or cancel) a resource assignment by a previous PDCCH transmission. In some implementations, the UE is configured with S search space sets in a given DL BWP, where search space set is indexed by s. UL cancellation indication (UL CI) or rescheduling grant can be configured to be transmitted on at least one of the search space sets. A DCI format for UL CI or rescheduling grant can be referred to as DCI format x-y, where x can be 0 as chosen for UL grant in specifications, and y can be 0 or 1. In some implementations, x can be 2 if transmitted in a common DCI in a PDCCH as chosen for common PDCCH in the specifications and y=>1 can be integer, such as y can be 1 or 4. If y=1, it may imply DL preemption indication DCI format 2_1 can be reused for UL cancellation as well. The size of the DCI format x-y can be the (i) same as DCI format 0_0, (ii) same as DCI format 2_1 if the latter is configured in the same search space, or (iii) as configured by UE-specific RRC signaling. Other sizes are possible.

In some implementations, for a search space set s where a UL CI or rescheduling grant can be monitored, the UE can be provided an indication by higher layer parameter dciFormat-x-y as part of a SearchSpace higher layer configuration. If an indication is present, the UE can monitor for DCI format x-y messages in the search space set s. In some implementations, UE monitors the search space set s such as for DCI format x-y only after a trigger, e.g., detection of a valid UL grant or starting from a specified number of symbols (Ns) preceding certain UL transmission opportunities. Such transmission opportunities can include one or more of: Types 1 or 2 CG PUSCH transmissions, SRS transmissions, or PUCCH transmissions based on semi-static configurations (e.g., for scheduling request (SR), periodic or semi-persistent CSI feedback).

Figure 11:
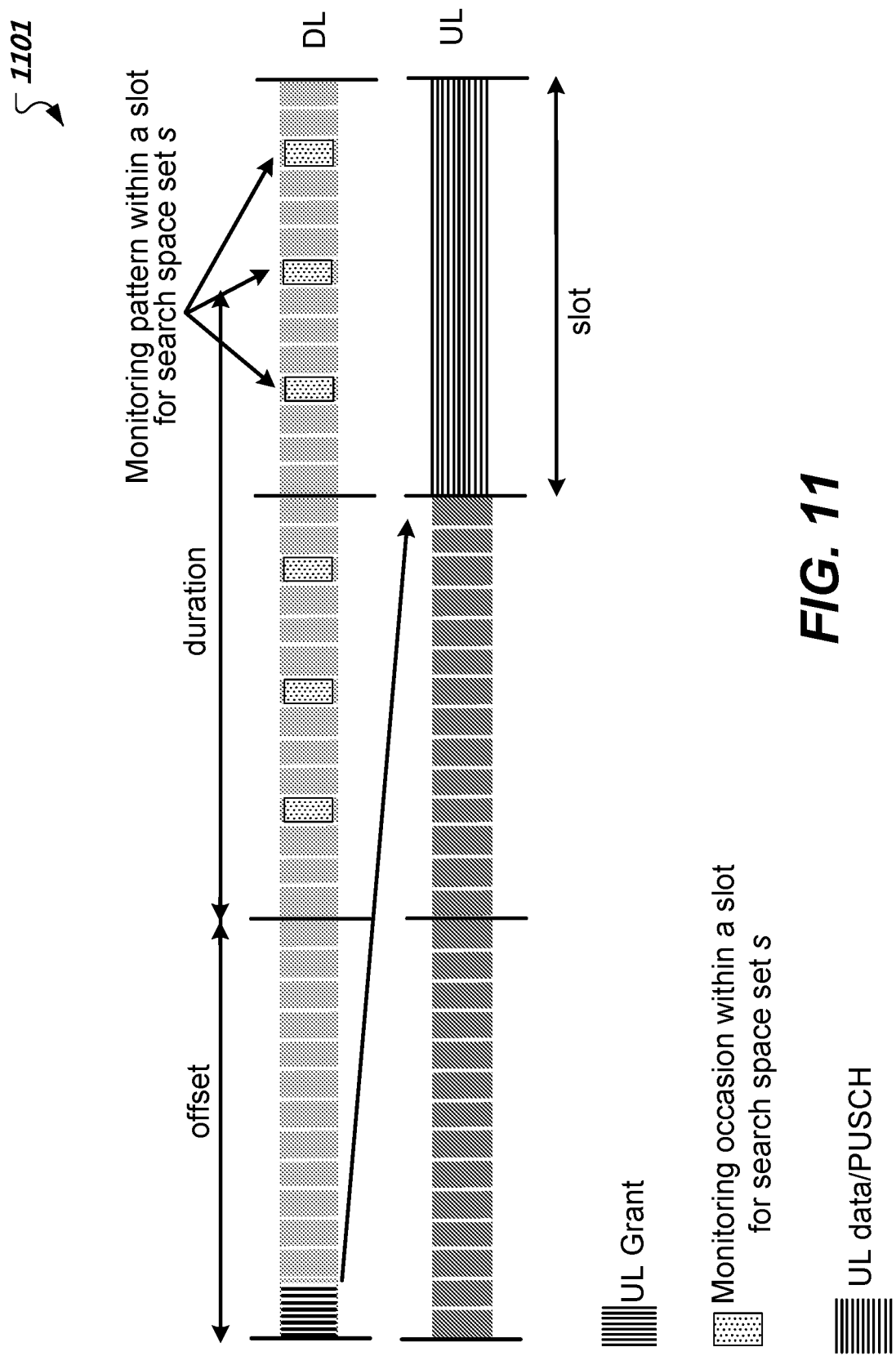
FIG. 11 illustrates an example of a monitoring timeline associated with a search space set which can be configured with a monitoring pattern within a slot, offset from a reference point, and a duration to monitor for an uplink cancellation indication, a rescheduling grant, or both.

FIG. 11 illustrates an example of a monitoring timeline 1101 associated with a search set which can be configured with a monitoring pattern within a slot, offset from a reference point, and a duration to monitor for an uplink cancellation indication, a rescheduling grant, or both. The network can provide, via a higher layer, a duration parameter for the search space set s to the UE. The duration parameter can control a monitoring window and can be indicated in slots or symbols. In some implementations, the duration parameter can be the same as or separately configured from a CSS duration parameter in the 3GPP NR specifications. The network can provide, via a higher layer, a monitoring offset parameter to indicate when the monitoring window starts. In this example, there are multiple monitoring occasions within a slot for the search space set. The locations of the monitoring occasions within a slot can be controlled by a monitoring pattern parameter. The monitoring pattern parameter can be configured for the search space set s by a higher layer parameter such as monitoringSymbolsWithinSlot.

In some implementations, the search space set s can be configured with a periodicity. The UE can monitor for DCI format x-y messages in search space set s according to the configured monitoring periodicity within the window controlled by the duration parameter. In some implementations, once a UE detects a DCI format x-y message in one of the monitoring occasions in the search space set s, the UE skips monitoring for the remaining occasions within the slot. In some implementations, UE skips monitoring for the remaining occasions for search space set s within the duration.

In some implementations, UE monitors for search space set s based on a trigger, such as receiving an assignment from network. In some implementations, the search space set s can be indexed at a lower value than other existing search space set indices, however the UE can be configured to give higher priority to the search space set s. This is because each search space set may have a given number of PDCCH candidates and the UE may not exceed a total number of blind detection attempts within a slot over all the search space sets configured for the UE. In some implementations, if the search space set s is used on-demand, the set can be identified as a higher priority search space set (irrespective of the search space set index), and if needed, one or more other search space sets can be dropped in a given slot. This can be realized by including a priority parameter in the search space set configuration. In another example, search space set s can also be used for monitoring other DCI formats as well with a periodicity, however, if a trigger is received, UE may monitor the search space set s in successive slots although it may have a periodicity that is larger than a slot. In some implementations, the UE uses the duration parameter if a trigger is received, otherwise the UE follows a search space set s configuration with periodicity.

In some implementations, the UE activates a monitoring window for the search space set s based on the duration and offset parameters following a reception of an assignment, such as a UL grant. In some implementations, the UE can monitor the search space set s following a configured periodicity. In some implementations, the search space set s has a periodicity of K=5 slots, and the duration parameter is 2 slots. A UL grant can be received in a DL slot n that schedules a start of a UL transmission in UL slot n+K2. The K2 parameter indicates a time between UL grant and UL data transmission, and can be expressed in slots or symbols, e.g., K2=2 slots. In some implementations, offset to the start position of the monitoring window can be obtained based on a minimum UE processing time of a PDCCH transmission in a NR system. A parameter N3 can be identified to define the PDCCH processing time in slots or symbols, for a given numerology. N3 can be smaller than N2, which is the number of OFDM symbols required for the UE to process from the end of the PDCCH transmission containing the UL grant to the earliest possible start of the corresponding PUSCH transmission from UE perspective. N3 can be UE capability parameter, and reported by the UE, e.g., as part of RRC connection setup. In some implementations, duration may start after an offset of one slot, e.g., from DL slot n+1 and end at slot n+2. UE can monitor search space set s according to a pattern as given by parameter monitoringSymbolsWithinSlot or a separately configured parameter within the slots n+1 and n+2. UE can resume monitoring for search space set s again in the next configured periodic occasion. In some implementations, at least part of the search space set configuration is dynamically activated, which can be different from a fully-semi-static search space set configuration.

In some implementations, the search space set s is not configured with a duration parameter. UE can implicitly determine a duration parameter for monitoring search space set s following a trigger. In some implementations, depending on the length of a scheduled UL transmission, UE can determine when the monitoring window duration ends. In some implementations, UE can monitor the set s after an offset with periodicity of one slot according to the pattern given by parameter monitoringSymbolsWithinSlot and does not monitor after an end of the scheduled UL transmission.

In some implementations, the number of blind decoding attempts and/or CCEs for channel estimation within a slot can be dynamically increased following a trigger. A search space set s can be used when following a trigger which may require a larger number of blind decoding attempts and/or CCEs for channel estimation within a slot than the existing numbers of blind decoding attempts and/or CCEs for channel estimation before the trigger was received. UE may report in UE-NR-Capability if such behavior can be supported by the UE. In some implementations, a grant scheduling a PUCCH can trigger the UE to monitor for a cancellation of the PUCCH. The cancellation can be a partial or a complete cancellation. In some implementations, UE may not expect to monitor for a cancellation indication to cancel periodically configured UL transmissions, such as SRS or CSI feedback reporting in PUCCH.

In some implementations, a UE configured with a Type 1 or Type 2 UL configured grant can monitor for a UL CI or rescheduling grant or UL grant according to above mentioned behaviors. The offset to the start position of duration or start location of monitoring occasions can be counted from a reference point such as a location in time preceding by a number of slots and/or symbols where a scheduled UL transmission starts, or preceding by a number of slots and/or symbols the boundary of the slot where a UL transmission opportunity starts. In some implementations, for Type 2 UL configured grant, offset to start position of duration or start location of monitoring occasions can be counted from the slot where DCI activating Type 2 UL configured transmission is received.

The network can indicate which transmissions are subject to an indication such as a preemption indication, cancellation indication, or a rescheduling indication. In some implementations, such indications can be applied other UL transmissions, beyond dynamically scheduled PUSCH transmissions. In some implementations, the network can specify that certain types of transmissions can be subject to these indications. In the case of UL grant-free transmissions, where the transmission opportunities are semi-statically configured, a device such as a UE can specify whether or how the gNB may cancel or reschedule some or all of the PUSCH transmission opportunities. In some implementations, the network can specify whether PUCCH transmission opportunities, or another type of a semi-statistically configured transmission opportunities, are subject to these indications.

In some implementations, in the case of a configured grant UL transmission (where the duration of each transmission opportunity is known), a threshold can be defined, such that if a transmission duration is longer than the threshold, the UE is required to monitor for one or more indications such as a preemption indication, cancellation indication, or a rescheduling indication. In some implementations, if a transmission occupies a relatively long duration, the UE may need to cancel that transmission and start a higher priority transmission.

In some implementations, for PUCCH transmissions, depending on the duration of the configured PUCCH (e.g., long PUCCH formats), the UE can be configured to monitor for any preemption, cancellation, or rescheduling indications. In some implementations, short transmissions, e.g., when there is no repetition configured, SRS, or for short PUCCH formats, may not be subject to preemption, cancellation, or rescheduling.

In some implementations, PUSCH transmissions, including both dynamically scheduled as well as Types 1 and 2 CG PUSCH, are subject to preemption, cancellation, or rescheduling. In some implementations, only dynamically scheduled PUSCH transmissions are subject to preemption, cancellation, or rescheduling. These can be further extended by limiting the applicability of preemption, cancellation, or rescheduling indications to PUSCH transmissions with overall duration (including any repetitions) longer than 2 or 4 symbols. Similar rules as a function of the transmission duration can be applied to SRS as well as PUCCH transmissions.

In some implementations, rescheduling can be performed for both grant-based (GB) and grant-free (GF) UL transmissions. As such, as long as the same HARQ Process Identifier (PID) are referred to, the UE can be configured to switch between these operations, and the GF UL transmission can be subject to the same rescheduling mechanism as mentioned earlier (while different scrambling RNTIs can be used for GB vs GF). Particularly, the rescheduling grant may trigger the UE to switch between the GF and GB operations. In some implementations, when the UE receives the rescheduling grant before completion of a current transmission in the GF operation, the GF PUSCH transmission opportunities can be overwritten by GB transmission opportunities.

In some implementations, PUSCH transmissions can be based on dynamic grants or configured grants and can be cancelled by a UL CI. The UL CI can be transmitted by in a UE-specific DCI message such as UL grant or in a group common DCI message.

In some implementations, the UL cancellation indication can be applicable to both dynamic grant-based PUSCH and configured grant PUSCH, e.g., Type 1 or Type 2. In some implementations, higher layer configuration of a configured grant PUSCH may include an identifier that the PUSCH is prioritized even if a cancellation indication indicates a resource that overlaps with a PUSCH transmission occasion based on a configured grant.

In some implementations, a UL grant format such as a DCI format 0_0 or DCI format 0_1 can include a field to indicate whether the corresponding scheduled PUSCH can be preempted or cancelled, if a subsequent cancellation indication is received and indicates a resource that overlaps with that of a scheduled PUSCH. For example, a value 0 may indicate that the transmission is prioritized and may not be preempted or cancelled by another L1 signaling such as a UL grant or cancellation indication, or vice versa. In some implementations, a CBGTI field in a UL grant scheduling initial transmission can be used to indicate that transmissions by a HARQ process indicated in the UL grant are prioritized and may not be cancelled.

In some implementations, if the UE identifies a PUSCH transmission that should prioritized or not cancelled, the UE does not monitor for cancellation indications until the end of the scheduled PUSCH transmission. In some implementations, the duration may start after the DCI message that scheduled the PUSCH transmission and stops at the end of the scheduled PUSCH transmission plus Ta. In some implementations, Ta can be a cancellation time based on a cancellation indication, N2, or a higher layer configured minimum value of K2 (time offset between UL grant and PUSCH transmission).

In some implementations, if monitoring is turned ON e.g., either via higher layer configuration or based on an indication in a grant, UE can increase monitoring activity. UE can monitor for a UL CI over a configured monitoring window, e.g., following a UL grant or a higher layer configuration. In the activation of a search space set s, a higher layer can configure a duration of $T_{p,s}$ which indicates a number of symbols or slots that the search space set s exists for a configured monitoring duration or pattern. The UE, for example, can receive a UL grant in symbol 0 in slot n, starts monitoring for a CI or PI from symbol k>0 in slot n, every p>0 symbols, until symbol m=>0 of slot n+d, d>0.

The start position of a duration can be configured or implicitly obtained based on an offset between UL grant and PUSCH. The search space set can be activated in an aperiodic manner, e.g., only monitored when UE is expecting a cancellation indication. In some implementations, UE monitors the search space set that is configured with the DCI format of a cancellation indication or UL grant that can cancel a transmission during the monitoring window. In some implementations, UE may prioritize a search space set that is associated with the DCI format of UL CI over other sets for a given budget of a maximum number of PDCCH candidates monitored when the monitoring window for UL CI is active.

In some implementations, activation of monitoring UL CI can be implicitly obtained based on a length of PUSCH. For example, if the scheduled or configured PUSCH length is less than K symbols, the UE expects that the transmission would not be cancelled. In some implementations, K={4, 7, 14} symbols for a given numerology.

In some implementations, a rescheduling DCI such as a fall back or non-fall back DCI for UL scheduling can be used for UL cancellation, e.g., with the NDI bit not toggled. In some implementations, the UE can cancel one or more PUSCH transmissions or repetitions after an application or preparation time, e.g., $T_{proc,2}$ time, from the end of a PDCCH carrying a rescheduling DCI, where the PUSCH transmission is identified by the HARQ PID used in the rescheduling DCI (see, e.g., 3GPP TS 38.214).

UE can be configured to cancel a part of a PUSCH transmission if the application time corresponds to a middle of the PUSCH transmission. In some implementations, the UE can cancel the PUSCH occasion or repetition after an application or preparation time, e.g., $T_{proc,2}$ time, from the end of a PDCCH carrying a rescheduling DCI. In some implementations, the UE may cancel a part of the PUSCH transmission if the application time corresponds to a middle of the PUSCH transmission. In some implementations, the UE may still continue transmission of the remaining part of PUSCH transmission after a partial cancellation.

In some implementations, if the UL-SCH indicator bit=0, CSI request field=all zeros in the UL grant such as format 0_1 is received for a HARQ PID (PID indicated in the UL grant), it may indicate a cancellation of a UL transmission associated with a HARQ PID. UL grant transmission with UL-SCH indicator bit=0, CSI request field=all zeros can be referred to as an empty grant, e.g., UL grant which does not schedule any transmission. In some implementations, if a UL transmission of the HARQ PID was scheduled before, the UL grant may cancel the previously scheduled transmission and not reschedule any transmission for the HARQ PID. UE may or may not flush the transmit buffer of the cancelled transmission for that HARQ PID. In some implementations, NDI bit is not toggled in the UL grant as this is not a new transport block for the HARQ PID. In another example, NDI bit can be a fixed value, or either toggle or no toggled, and UE may identify cancellation of a previously scheduled transmission for a given HARQ PID based on the bit values of fields UL-SCH indicator bit and CSI request, e.g., if the UL-SCH indicator bit=0, CSI request field=all zeros.

In some implementations, if a UE receives a UL grant with the UL-SCH indicator bit=0, CSI request field=all zeros, UE may assume the UL grant is a cancellation indication and UE may identify the time-frequency region for UL transmission cancellation based on the time domain resource assignment and frequency domain resource assignment fields. UE may cancel one or more UL transmissions, including one or more subsequent or ongoing, scheduled or configured grant, PUSCH, SRS, PUCCH transmissions that overlap with the indicated time-frequency region. In some implementations, UE ignores the HARQ PID in this case as cancellation can be applied to a group of UL transmissions that overlaps with the indicated region.

In some implementations, once the UE determines that the UL grant is indicating a cancellation, one or more fields in the UL grant can be re-interpreted to indicate parameters related to UL cancellation. Examples of UL cancellations parameters can include a time-frequency bitmap for cancelling an impacted UL transmission, a time-frequency region information for cancelling an impacted UL transmission, start position of the region in time and/or frequency, and time-frequency granularity of cancellation indication via one or more fields in the UL grant. In some implementations, a time-frequency bitmap, where each bit maps to a partition within a configured time-frequency region, indicates where to cancel transmission, i.e., which partitions are impacted, within the time-frequency region can be signaled by re-interpreting frequency domain and time domain resource assignment fields having N=>1 and M=>1 bits respectively, e.g., M+N bits in those two fields can be used to indicate a bitmap for signaling cancellation over M+N partitions within a configured time-frequency region.

In some implementations, one or more of fields in a UL grant can be re-interpreted to indicate one or more of time-frequency bitmap comprising K=>1 bits to indicate which of the K partitions are impacted within a first time-frequency region, first time-frequency region comprising one or more of span in time and in frequency and where the region starts in frequency and in time, time-frequency granularity or value of K. If not indicated via DCI, one or more parameters related to UL cancellation indication can be configured by higher layer signaling, such as UE-specific RRC signaling. Fields within a UL grant can include a bandwidth part indicator, frequency domain resource assignment, time domain resource assignment, frequency hopping flag, modulation and coding scheme, new data indicator, redundancy version, HARQ process number, downlink assignment index, transmit power command (TPC) command for a scheduled PUSCH transmission, SRS resource indicator, precoding information and number of layers, antenna ports, SRS request, CBGTI, PTRS-DMRS association, beta_offset indicator, and a DMRS sequence initialization. Other and different fields for a UL grant are possible.

In some implementations, UE receives a first UL grant, such as format 0_0 or format 0_1, at time t0 for a first HARQ process. Subsequently, if a UE receives a second UL grant, such as format 0_0 or format 0_1, at time $t_1$> t0 for the first HARQ process, where a MCS field in the second UL grant indicates one of the reserved entries, e.g., MCS indices 28 to 31 in the MCS table including 32 entries (see, e.g., Tables 6.1.4.1-1 and 6.1.4.1-2 in 3GPP TS 38.214), and a NDI bit in the second UL grant is toggled with respect to the NDI bit value in first UL grant, then UE may identify the second UL grant indicates cancellation of transmission for the indicated HARQ process. The second UL grant can serve as an empty grant that cancels a previously scheduled transmission. In some implementations, the second UL grant, serving a cancellation indication, needs to be received within a certain time window following the reception of the first UL grant. In some implementations, $t_1-t_0<=P$, where P is indicated in a UL grant and equals the duration between the start time of a PUSCH transmission and the corresponding end time, which can be measured in slots or sub-slots.

In some implementations, a UE receives a first UL grant, such as format 0_0 or format 0_1, at time t0 for a first HARQ process. Subsequently, if a UE receives a second UL grant, such as format 0_0 or format 0_1, at time $t_1>t_0$ for the first HARQ process, where MCS field in the second UL grant indicates one of the reserved entries, e.g., MCS indices 28 to 31 in the MCS table including 32 entries, (see, e.g., Tables 6.1.4.1-1 and 6.1.4.1-2 in 3GPP TS 38.214), and NDI bit in the second UL grant is toggled with respect to the NDI bit value in first UL grant, then the UE can determine that the second UL grant indicates a cancellation of a transmission, where the cancellation may apply to any previously scheduled PUSCH, e.g., PUSCH associated with first HARQ process, configured grant PUSCH, SRS, PUCCH transmissions that overlap with an indicated time-frequency resource. In another example, once the UE determines that the UL grant indicates a cancellation, one or more fields in the UL grant can be re-interpreted to provide UL cancellation related parameters. Examples of such parameters can include one or more of the following: time-frequency resources related to the cancellation, such as one or more of time-frequency region information, e.g., a time-frequency bitmap, for cancelling an impacted UL transmission, start position of the region in time and/or frequency, time-frequency granularity of the cancellation indication via one or more fields in the UL grant. In some implementations, a time-frequency bitmap, where each bit maps to a partition within a configured time-frequency region, to indicate where to cancel transmission, i.e., which partitions are impacted, within the time-frequency region can be signaled by re-interpreting frequency domain and time domain resource assignment fields having N=>1 and M=>1 bits respectively, e.g., M+N bits in those two fields can be used to indicate a bitmap for signaling cancellation over M+N partitions within a configured time-frequency region.

In some implementations, one or more fields in a UL grant can be re-interpreted to indicate one or more of: time-frequency bitmap comprising K=>1 bits to indicate which of the K partitions are impacted within a first time-frequency region, first time-frequency region comprising one or more of span in time and in frequency and where the region starts in frequency and in time, time-frequency granularity or value of K. If not indicated via DCI, one or more parameters related to UL cancellation indication can be configured by higher layer signaling, such as UE-specific RRC signaling. Fields within a UL grant can include a bandwidth part indicator, frequency domain resource assignment, time domain resource assignment, frequency hopping flag, redundancy version, HARQ process number, downlink assignment index, TPC command for scheduled PUSCH, SRS resource indicator, precoding information and number of layers, antenna ports, SRS request, CBGTI, PTRS-DMRS association, beta_offset indicator, and a DMRS sequence initialization. Other and different fields for a UL grant are possible.

In some implementations, if a UL grant is received for a given HARQ PID at least a $T_{proc,2}$ time before a scheduled PUSCH transmit occasion of the CG PUSCH for that HARQ ID, UE may cancel the CG PUSCH transmission or a CG PUSCH repetition or all subsequent PUSCH repetitions and follow assignment in the UL grant. In some implementations, if the UL-SCH indicator bit=0, CSI request field=all zeros in the first UL grant such as format 0_1 is received for a first HARQ PID (PID indicated in grant), it may indicate cancellation of the CG PUSCH UL transmission, PUSCH repetition, or all subsequent PUSCH repetitions associated with the HARQ PID and UE would not retransmit the PUSCH or PUSCH repetition. In some implementations, UE only cancels a PUSCH repetition (e.g., next PUSCH repetition after indication of cancellation) and still transmits subsequent PUSCH repetitions.

In some implementations, a new UE-specific DCI format can be used for UL CI, which can be received with a new configured RNTI or C-RNTI. The new DCI format can be size matched to a fall back DCI format. In some implementations, the new DCI format is a scheduling DCI, e.g., scheduling DCI containing an empty grant, and the can determine the time-frequency area to be cancelled based on the time and frequency resource indication in the DCI.

A new DCI format can include one or more of following configurable fields: a header or flag if multiple DCI format have same size; a time-frequency region field to indicate which time-frequency region, e.g., an impacted area, is to be cancelled; coarse indication field, which can be 1 bit, to indicate whether to cancel a remaining PUSCH/repetition occasions or only the impacted region; a CBG-level field to indicate which CBGs are to be cancelled; one or more HARQ IDs; carrier indicator; BWP indicator; one or more power control parameters, if UE is required to adjust transmit power in the impacted area; a field to indicate whether to transmit an uplink control information (UCI) or not, if UCI originally chosen to be multiplexed onto the overlapping PUSCH (it can be possible that the UE can still transmit UCI on PUCCH although PUSCH needs to be cancelled); and a zero padding field. In some implementations, a time-frequency region field can include a bit field containing XY≥1 bits, to indicate which area to cancel transmission, where X indicates the number of time partition and Y indicates the number of frequency partitions within a configured region. The time and frequency granularity can be configured. In some implementations, the UE can determine the impacted area based on a configured offset from the location of a DCI or identify the PUSCH/repetition to be cancelled after a $T_{proc,2}$ time of DCI. In some implementations, a power control parameter can include a 2-bit field where a 00 bit value indicates cancel, and other values indicate a power adjustment on an overlapping transmission.

In some implementations, group-common DCI format can be used for a UL CI, which can include one or more of the following fields: a common time-frequency region field to indicate which time-frequency region to be cancelled; one or more UE-specific fields with coarse indication, a 1-bit coarse indication field in each UE-specific field, to indicate whether a transmission is to be cancelled; an offset field to indicate an offset to a start position of the configured region in time, e.g., from the last symbol of PDCCH carrying a CI. In some implementations, the offset field is configured by a higher layer. In some implementations, the common time-frequency region field can include a bit field containing XY≥1 bits, to indicate which area to cancel transmission, where X indicates the number of time partition and Y indicates the number of frequency partitions within a configured region. The time and frequency granularity can be configured. The region field can include a carrier specific common field, each including XY bits. In some implementations, X={1, 2, 3} and Y={1, 2, 3, 4, 5, 6, 7}. Other values for X and Y are possible. A time domain granularity can be from 1 to 14 symbols, frequency domain granularity can be from ½, ¼, ⅛, or ¹⁄₁₆ of an active BWP. A reference configured region can be a group of contiguous symbols, a group of contiguous PRBs, or both. In some implementations, if a UL CI is transmitted in a GC DCI message, then a UE only cancels the PUSCH or PUSCH repetitions overlapping with the indicated region and may still transmit the remaining PUSCH repetitions.

In some implementations, if a UE can multiplex UCI onto a PUSCH in a slot and UE receives UL CI which indicates cancellation of PUSCH, UE may still transmit UCI in the original PUCCH resource if the PUCCH resource does not overlap with the indicated time-frequency region to be avoided by the UL CI. In some implementations, if PUCCH resource of a scheduled UCI message overlaps with a first PUSCH and a second PUSCH in a slot and the first PUSCH is located before the second PUSCH, UE can multiplex the UCI message onto the first PUSCH unless a UL CI is received that cancels the first PUSCH, then the UE can multiplex the UCI message onto the second PUSCH if it does not overlap with the indicated region by the UL CI.

The network may use a given bandwidth part in a carrier for overlapping transmission of multiple service types. For example, a 60 kHz bandwidth part can be used which can benefit low latency transmissions. In order to facilitate overlapping transmissions so that one or more of the overlapping transmissions are not adversely affected, a UE can be provided with some parameters, such as power control parameter, should network expect subsequent overlapping transmissions. If overlapping transmissions are not expected, the UE can operate with existing or according to other indicated power control parameters. In some implementations, a network can provide dynamic indication of power control parameters to one or more UEs having overlapping transmissions. In some implementations, a UE can be provided with a power control parameter as part of a BWP configuration, independent configuration, or part of other UL associated configuration, which can be turned OFF by default. The parameter value can be turned ON when such overlapping transmission is expected. The parameter can be indicated by UE-specific RRC signaling.

A UE can be configured with one or more RNTIs where each RNTI can be used to scramble the CRC appended to the DCI format. In some implementations, a UE is configured with RNTI A and RNTI B. One or more parameters related to UL transmission can be implicitly obtained from which RNTI is used. For example, a first set of power control parameters can be assumed if RNTI A is used. S second set of power control parameters can be assumed if RNTI B is used. For example, RNTI B can be used by the network with a UL grant when the grant provides resources in an overlapping manner with other transmissions, so that UE can use an appropriate power setting to control UL interference.

Figure 12:
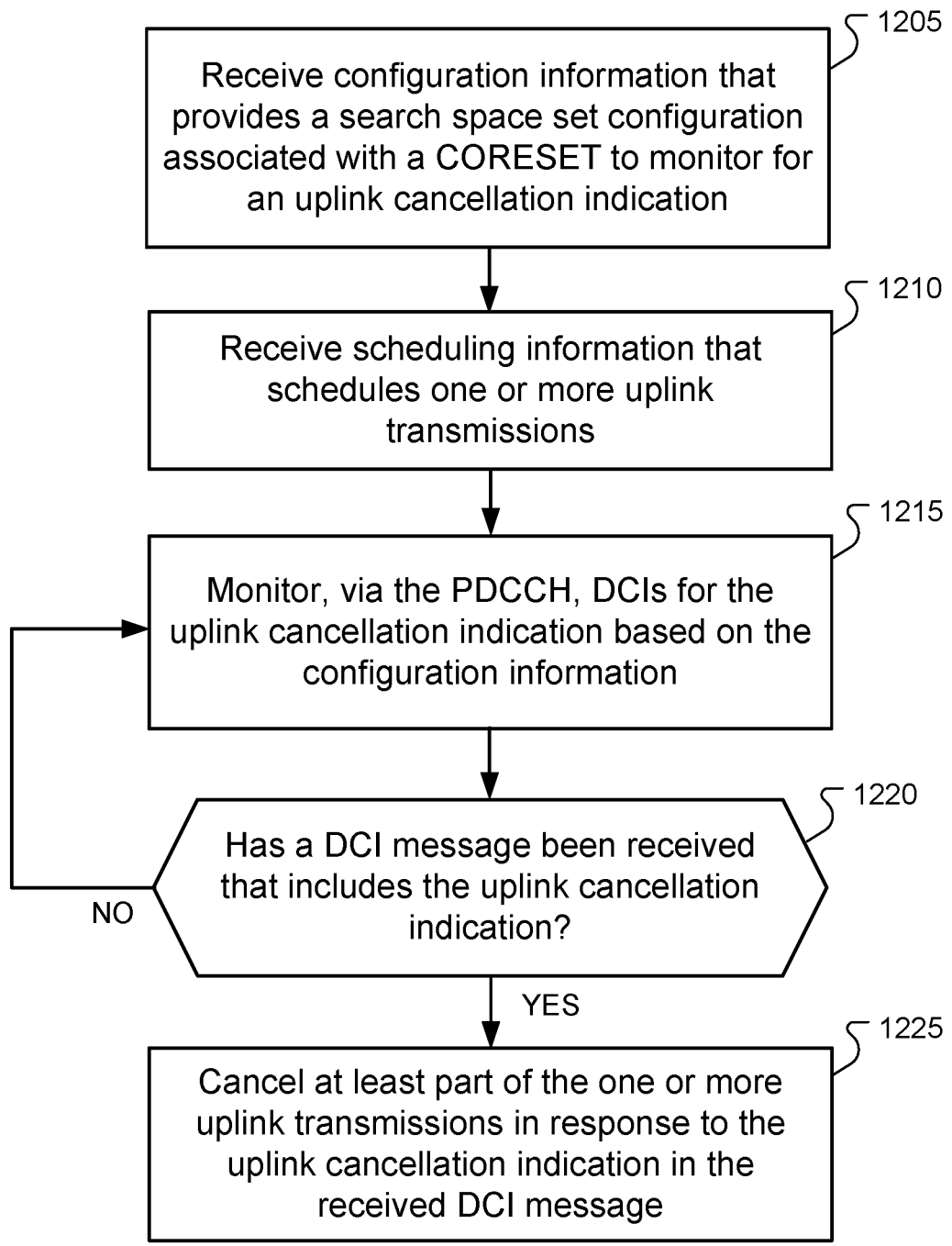
FIG. 12 illustrates a flowchart of a process performed by a UE to monitor for and respond to a cancellation indication.

FIG. 12 illustrates a flowchart of a process performed by a UE to monitor for and respond to a cancellation indication. At 1205, the UE receives configuration information that provides a search space set configuration associated with a CORESET to monitor for an uplink cancellation indication. Receiving the configuration information can include receiving the configuration information in RRC signaling. The configuration information can include a monitoring duration to control a monitoring window during which the UE monitors the PDCCH for a cancellation indication, a monitoring offset to a start position of the monitoring window, a PDCCH monitoring periodicity, a monitoring pattern within a slot, or a combination thereof. In some implementations, the configuration information includes a cancellation indication based RNTI for using in detecting a DCI message that is scrambled by the RNTI.

At 1210, the UE receives scheduling information that schedules one or more uplink transmissions. In some implementations, receiving the scheduling information includes receiving an uplink grant that schedules a PUSCH transmission. The uplink grant can be given in a DCI message. In some implementations, the scheduled PUSCH transmission is associated with a HARQ process.

At 1215, the UE monitors for the uplink cancellation indication based on the configuration information. Monitors for the uplink cancellation indication can include detecting a DCI message contained within a CORESET corresponding to the search space set configuration. In some implementations, monitoring for the uplink cancellation indication includes activating the search space set configuration in response to a reception of a UE-specific PDCCH message that schedules the one or more uplink transmissions.

At 1220, the UE determines whether a DCI message has been received that includes the uplink cancellation indication. If not received, the UE continues monitoring at 1215. In some implementations, a DCI message containing a cancellation indication is a UE-specific DCI message. In some implementations, a DCI message containing a cancellation indication is a group common DCI message. In some implementations, the UE is configured to use a cancellation indication based RNTI to determine whether the UE should process a DCI message.

If a DCI has been received, the UE at 1225, cancels at least part of the one or more uplink transmissions in response to the uplink cancellation indication in the received DCI message. Cancelling at least part of the one or more uplink transmissions can include cancelling the PUSCH transmission, one or more repetitions of the PUSCH transmission, or both. Cancelling a scheduled transmission can also be referred to as dropping a scheduled transmission.

A communication technique that uses CI-based signaling includes receiving, by a UE, a first configuration signaling to provide a search space set configuration associated with a CORESET to monitor uplink cancellation indication; receiving, by the UE, a second configuration signaling to turn ON monitoring for an uplink cancellation indication; receiving, by the UE, a first UE-specific PDCCH to schedule an uplink transmission; receiving, by the UE, a second UE-specific PDCCH to indicate cancellation of a first part of the uplink transmission scheduled by the first PDCCH; and cancelling, by the UE, at least a part of the uplink transmission. In some implementations, the first configuration signaling is conveyed in a UE-specific RRC signaling. Configuration information can includes one or more of: duration during which UE monitors PDCCH, monitoring offset to the start position of duration, PDCCH monitoring periodicity, or monitoring pattern within a slot. In some implementations, the second configuration signaling is conveyed in a UE-specific RRC signaling. The technique can include receiving, by the UE, a second uplink grant that includes a MCS field to indicate a reserved entry and a NDI bit that is toggled compared to an NDI bit in a first uplink grant. In some implementations, cancelling at least a part of the uplink transmission can include cancelling a PUSCH transmission, and the UE does not retransmit. In some implementations, the second UE-specific PDCCH is monitored subsequent to the reception of the first UE-specific PDCCH. In some implementations, the first and second UE-specific PDCCHs are transmitted using the same DCI format. In some implementations, the configuration of the search space set is only active following reception and detection of the first UE-specific PDCCH. In some implementations, the UE is configured to ignore the periodicity configured as part of the search space set configuration and only monitor over the duration indicated.

Another communication technique includes receiving a first uplink grant, scheduling a PUSCH transmission for a HARQ PID; receiving a second uplink grant, for the HARQ PID, where the second uplink grant is received before or during a PUSCH resource; and cancelling by the UE, the PUSCH transmission. In some implementations, the UE is configured to retransmit the PUSCH transmission according to the second uplink grant. In some implementations, the UL-SCH indicator bit=0, CSI request=all zero. In some implementations, the UE cancels the PUSCH transmission and does not retransmit.

Yet another communication technique includes receiving a first uplink grant that schedules a PUSCH transmission for a first HARQ process identifier (PID) in a uplink resource; receiving a second uplink grant for the first HARQ PID, wherein the second uplink grant is received before or during the uplink resource; and cancelling the PUSCH transmission. In some implementations, the uplink resource is a first uplink resource, and the second uplink grant corresponds to a second uplink resource, and the UE is configured to transmit the PUSCH in the second uplink resource. In some implementations, the cancelled PUSCH transmission is not transmitted at a later time. In some implementations, the PUSCH transmission is to include HARQ feedback associated with the HARQ PID. In some implementations, the uplink resource is a new radio resource. In some implementations, the HARQ PID is associated with a new radio downlink transmission.

Still another communication technique includes receiving a first uplink grant to schedule a first PUSCH for a first HARQ PID; receiving a second uplink grant for the first HARQ PID, wherein the second uplink grant is received before or during a first PUSCH resource; and cancelling a PUSCH transmission of the first PUSCH resource.

The technique can include retransmitting the PUSCH transmission according to the second uplink grant. In some implementations, a UL-SCH indicator bit is equal to zero and a CSI request is equal to all zeros. In some implementations, the UE does not retransmit the canceled PUSCH transmission. In some implementations, a MCS field in the second uplink grant indicates a reserved entry and an NDI bit in the second uplink grant is toggled with respect to an NDI bit in the first uplink grant. In some implementations, the UE does not retransmit the cancelled PUSCH transmission.

Other techniques can include generating, transmitting, receiving, or processing a DCI that includes an uplink grant to indicate whether a scheduled PUSCH can be canceled, stopped, or preempted by a subsequent DCI. Still other techniques can include generating, transmitting, receiving, or processing an uplink grant that indicates cancellation of a scheduled PUSCH; and interpreting one or more fields in the uplink grant to indicate parameters related to an uplink cancellation.

These and other techniques can be performed by an apparatus that is implemented in or employed by one or more types of network components, user devices, or both. In some implementations, one or more non-transitory computer-readable media comprising instructions to cause an electronic device, upon execution of the instructions by one or more processors of the electronic device, to perform one or more of the described techniques. An apparatus can include one or more processors and one or more computer-readable media comprising instructions that, when executed by the one or more processors, cause the one or more processors to perform one or more of the described techniques.

The methods described here can be implemented in software, hardware, or a combination thereof, in different implementations. In addition, the order of the blocks of the methods can be changed, and various elements can be added, reordered, combined, omitted, modified, and the like. Various modifications and changes can be made as would be obvious to a person skilled in the art having the benefit of this disclosure. The various implementations described here are meant to be illustrative and not limiting. Many variations, modifications, additions, and improvements are possible. Accordingly, plural instances can be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations can be implemented as a combined structure or component.

The methods described herein can be implemented in circuitry such as one or more of: integrated circuit, logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), or some combination thereof. In some implementations, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code can be referred to as a particular type of circuitry. Circuitry can also include radio circuitry such as a transmitter, receiver, or a transceiver.

A number of implementations have been described. Nevertheless, it will be understood that various modifications can be made. Elements of one or more implementations can be combined, deleted, modified, or supplemented to form further implementations. As yet another example, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

What is claimed is:

1. A method comprising:
receiving, by an apparatus comprising one or more processors, configuration information that provides a search space set configuration associated with a control resource set (CORESET) to monitor for an uplink cancellation indication;
receiving, by the apparatus, scheduling information that schedules one or more uplink transmissions;
monitoring, by the apparatus via a physical downlink control channel (PDCCH), for the uplink cancellation indication based on the configuration information;
receiving, by the apparatus via the PDCCH, a downlink control information (DCI) message that comprises the uplink cancellation indication; and
cancelling, by the apparatus, at least part of the one or more uplink transmissions in response to the uplink cancellation indication in the received DCI message.

2. The method of claim 1, wherein receiving the configuration information comprises receiving the configuration information in radio resource control (RRC) signaling.

3. The method of claim 1, wherein the configuration information includes one or more of:
a monitoring duration to control a monitoring window for monitoring the PDCCH for a cancellation indication,
a monitoring offset to a start position of the monitoring window, a PDCCH monitoring periodicity, or
a monitoring pattern within a slot.

4. The method of claim 1, wherein receiving scheduling information comprises receiving a user equipment (UE)-specific message via the PDCCH, and
wherein monitoring for the uplink cancellation indication comprises activating the search space set configuration in response to a reception of the UE-specific PDCCH message.

5. The method of claim 1, wherein the configuration information comprises a cancellation indication based radio network temporary identifier (RNTI), and wherein the DCI message is scrambled by the cancellation indication based RNTI.

6. The method of claim 1, wherein the DCI message is a user equipment (UE)-specific DCI message.

7. The method of claim 1, wherein the DCI message is a group common DCI.

8. The method of claim 1, wherein receiving the scheduling information comprises receiving an uplink grant that schedules a physical uplink shared channel (PUSCH) transmission.

9. The method of claim 8, wherein the PUSCH transmission is associated with a hybrid automatic repeat request (HARQ) process identifier (PID).

10. The method of claim 8, wherein cancelling at least part of the one or more uplink transmissions comprises cancelling the PUSCH transmission, one or more repetitions of the PUSCH transmission, or both.

11. The method claim 1, wherein the method is performed by a user equipment (UE) device.

12. The method claim 1, wherein the method is performed by one or more baseband processors.

13. An apparatus comprising:
one or more processors; and
a memory storing instructions that, when executed by the one or more processors, cause the one or more processors to perform operations comprising:
receiving configuration information that provides a search space set configuration associated with a control resource set (CORESET) to monitor for an uplink cancellation indication;
receiving scheduling information that schedules one or more uplink transmissions;
monitoring for the uplink cancellation indication on a physical downlink control channel (PDCCH) based on the configuration information;
receiving a downlink control information (DCI) message on the PDCCH, the DCI message comprising the uplink cancellation indication; and
cancelling at least part of the one or more uplink transmissions in response to the uplink cancellation indication in the received DCI message.

14. The apparatus of claim 13, wherein receiving the configuration information comprises receiving the configuration information in radio resource control (RRC) signaling.

15. The apparatus of claim 13, wherein the configuration information includes one or more of:
a monitoring duration to control a monitoring window for monitoring the PDCCH for a cancellation indication,
a monitoring offset to a start position of the monitoring window, a PDCCH monitoring periodicity, or
a monitoring pattern within a slot.

16. The apparatus of claim 13, wherein receiving scheduling information comprises receiving a user equipment (UE)-specific message via the PDCCH, and
wherein monitoring for the uplink cancellation indication comprises activating the search space set configuration in response to a reception of the UE-specific PDCCH message.

17. The apparatus of claim 13, wherein the configuration information comprises a cancellation indication based radio network temporary identifier (RNTI), and wherein the DCI message is scrambled by the cancellation indication based RNTI.

18. The apparatus of claim 13, wherein the DCI message is a user equipment (UE)-specific DCI message.

19. The apparatus of claim 13, wherein the DCI message is a group common DCI.

20. The apparatus of claim 13, wherein receiving the scheduling information comprises receiving an uplink grant that schedules a physical uplink shared channel (PUSCH) transmission.

21. The apparatus of claim 20, wherein the PUSCH transmission is associated with a hybrid automatic repeat request (HARQ) process identifier (PID).

22. The apparatus of claim 20, wherein cancelling at least part of the one or more uplink transmissions comprises cancelling the PUSCH transmission, one or more repetitions of the PUSCH transmission, or both.

23. The apparatus of claim 11, wherein the apparatus comprises one or more baseband processors including the one or more processors and the memory.

24. A user equipment (UE) comprising:
the apparatus of claim 13, and
a transceiver.

* * * * *

UNITED STATES PATENT AND TRADEMARK OFFICE
CERTIFICATE OF CORRECTION

PATENT NO. : 12,250,694 B2
APPLICATION NO. : 17/438672
DATED : March 11, 2025
INVENTOR(S) : Toufiqul Islam et al.

It is certified that error appears in the above-identified patent and that said Letters Patent is hereby corrected as shown below:

In the Claims

Column 58, Line 32, In Claim 23, delete "claim 11," and insert -- claim 13, --.

Signed and Sealed this
Thirteenth Day of May, 2025

Coke Morgan Stewart
*Acting Director of the United States Patent and Trademark Office*